(12) United States Patent
Kernbaum

(10) Patent No.: US 12,359,708 B2
(45) Date of Patent: Jul. 15, 2025

(54) TRANSMISSION WITH RADIALLY INVERTED PULLEYS

(71) Applicant: SRI International, Menlo Park, CA (US)

(72) Inventor: Alexander Kernbaum, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 18/554,968

(22) PCT Filed: Jun. 27, 2022

(86) PCT No.: PCT/US2022/035190
§ 371 (c)(1),
(2) Date: Oct. 11, 2023

(87) PCT Pub. No.: WO2023/278358
PCT Pub. Date: Jan. 5, 2023

(65) Prior Publication Data
US 2024/0209922 A1    Jun. 27, 2024

Related U.S. Application Data

(60) Provisional application No. 63/215,626, filed on Jun. 28, 2021.

(51) Int. Cl.
*F16H 9/20* (2006.01)
*F16G 1/22* (2006.01)
*F16H 37/02* (2006.01)

(52) U.S. Cl.
CPC .................. *F16H 9/20* (2013.01); *F16G 1/22* (2013.01); *F16H 37/022* (2013.01)

(58) Field of Classification Search
CPC .... F16H 49/001; F16H 2049/003; F16H 9/04; F16H 9/16; F16H 1/22; F16H 9/20; F16H 37/022; F16H 55/56; F16H 55/46
(Continued)

(56) References Cited

U.S. PATENT DOCUMENTS 3,726,158 A * 4/1973 Brown ...................... F16H 1/32
475/167
6,117,044 A * 9/2000 Hoogenberg ........... F16H 15/54
476/52
(Continued)

FOREIGN PATENT DOCUMENTS

JP      2020512513 A    4/2020
WO      9421940 A       9/1994
(Continued)

OTHER PUBLICATIONS

The International Search Report (ISR) with Written Opinion for PCT/US2022/035190 dated Oct. 30, 2022, pp. 1-12.

*Primary Examiner* — Henry Y Liu
(74) *Attorney, Agent, or Firm* — McDonnell Boehnen Hulbert & Berghoff LLP

(57) ABSTRACT

A variety of transmission mechanisms are provided that include 'radially inverted' pulleys that are nested within each other or otherwise overlap in order to exert 'inward' forces onto a compressive belt that transmits power between the pulleys. By exerted forces 'inward' onto the belt, the belt can be subjected to net compression everywhere along its length. This allows the belt to be less complex and to have a lower cost than belts of transmissions that exert forces 'outward' from pulleys onto a belt, thus requiring expensive and technically challenging belt packs or other elements to sustain the longitudinal tensions experienced by such belts, even when such belts are operated as "push" belts. Transmissions that include such 'radially inverted' pulleys can (Continued)

exhibit reduced size and cost and increased power capacity compared to transmissions that employ 'non-radially inverted' pulleys.

22 Claims, 11 Drawing Sheets

(58) Field of Classification Search
USPC .............................................................. 474/8
See application file for complete search history.

(56) References Cited

U.S. PATENT DOCUMENTS

| | | | | |
|---|---|---|---|---|
| 6,257,186 | B1* | 7/2001 | Heer | F01L 1/352 |
| | | | | 123/90.31 |
| 6,302,073 | B1* | 10/2001 | Heer | F01L 1/46 |
| | | | | 74/568 R |
| 6,328,006 | B1* | 12/2001 | Heer | F01L 1/34 |
| | | | | 123/90.11 |
| 6,477,918 | B2* | 11/2002 | Sakamoto | F16M 11/10 |
| | | | | 475/149 |
| 6,772,655 | B2* | 8/2004 | Poehlau | H02K 7/06 |
| | | | | 74/89.23 |
| 7,409,891 | B2* | 8/2008 | Takemura | H02K 41/06 |
| | | | | 74/640 |
| 9,163,710 | B2* | 10/2015 | Kanai | F16H 35/00 |
| 10,774,907 | B2* | 9/2020 | Kernbaum | F16H 9/04 |
| 11,732,787 | B2* | 8/2023 | Kernbaum | F16H 9/20 |
| | | | | 474/46 |
| 12,007,023 | B2* | 6/2024 | Shear | F16H 55/46 |
| 2003/0121363 | A1* | 7/2003 | Poehlau | H02K 7/06 |
| | | | | 475/182 |
| 2004/0177718 | A1* | 9/2004 | Poehlau | G01D 5/145 |
| | | | | 74/640 |
| 2007/0039414 | A1* | 2/2007 | Takemura | F16H 49/001 |
| | | | | 74/640 |
| 2007/0101820 | A1* | 5/2007 | Bulatowicz | F16H 49/001 |
| | | | | 74/640 |
| 2011/0154928 | A1* | 6/2011 | Ishikawa | F16H 55/0833 |
| | | | | 74/461 |
| 2014/0256495 | A1* | 9/2014 | Waide | F16H 49/001 |
| | | | | 475/167 |
| 2015/0107387 | A1* | 4/2015 | Kuo | F16H 49/001 |
| | | | | 74/412 R |
| 2018/0320766 | A1* | 11/2018 | Kernbaum | F16H 55/563 |
| 2019/0264791 | A1* | 8/2019 | Atmur | F16H 55/0833 |
| 2020/0040981 | A1* | 2/2020 | Zhao | F16C 23/082 |
| 2020/0166106 | A1* | 5/2020 | Kernbaum | F16H 9/18 |
| 2021/0364046 | A1 | 11/2021 | Kernbaum et al. | |

FOREIGN PATENT DOCUMENTS

| | | |
|---|---|---|
| WO | 2004/031612 | 4/2004 |
| WO | 2004031612 A1 | 4/2004 |
| WO | 2007067038 A2 | 6/2007 |
| WO | 2019/226713 | 11/2019 |
| WO | 2021/101541 | 5/2021 |

* cited by examiner

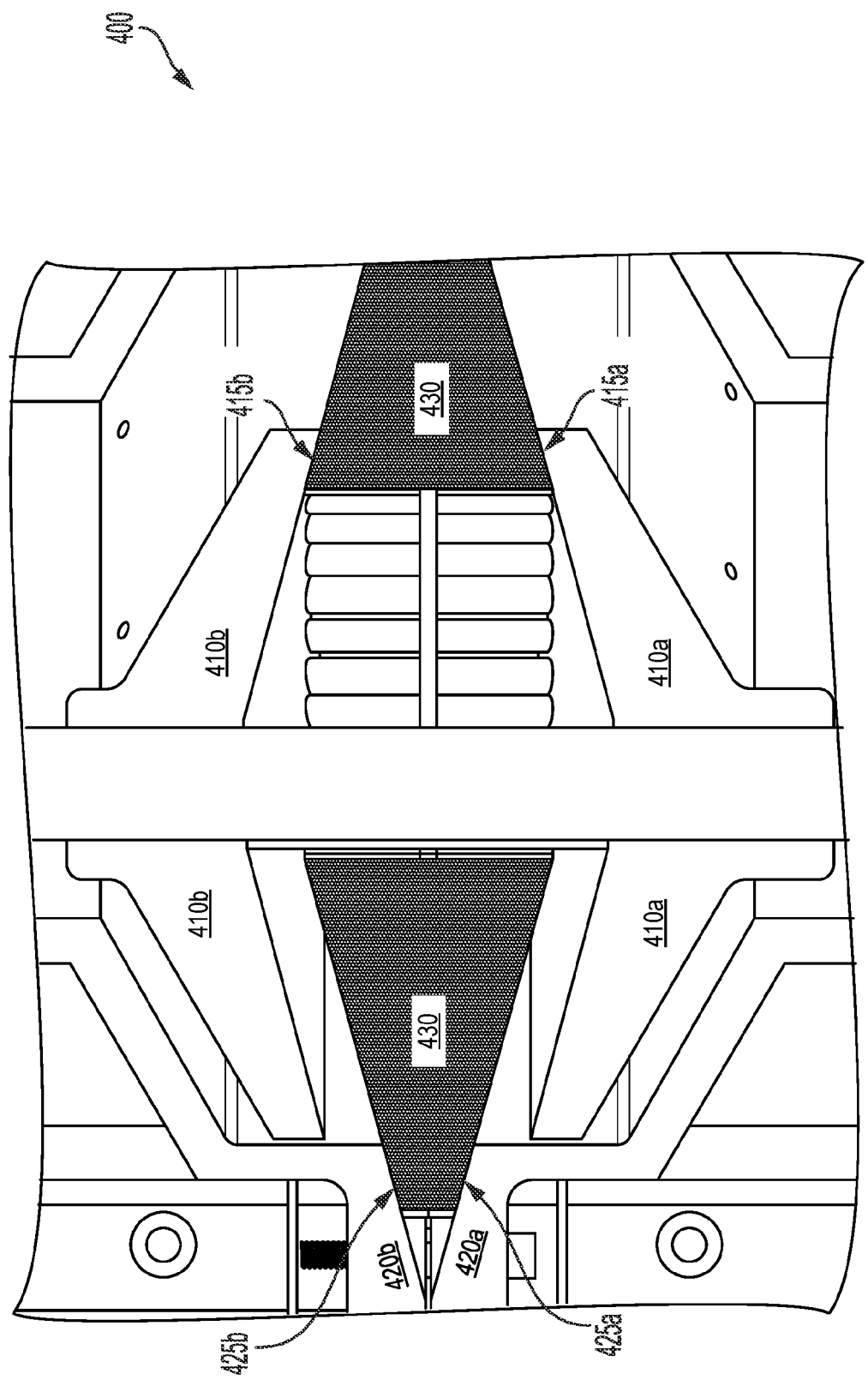

TRANSMISSION WITH RADIALLY INVERTED PULLEYS

CROSS-REFERENCE TO RELATED APPLICATIONS

This application claims priority to U.S. Provisional Patent Application No. 63/215,626, filed Jun. 28, 2021, the contents of which are incorporated by reference. This application incorporates by reference PCT Application No. PCT/US2018/025804, filed Apr. 3, 2018, PCT Application No. PCT/US2019/033414, filed May 21, 2019, and PCT Application No. PCT/US2019/062486, filed Nov. 20, 2019.

BACKGROUND

Unless otherwise indicated herein, the materials described in this section are not prior art to the claims in this application and are not admitted to be prior art by inclusion in this section.

Transmissions are included as part of a variety of mechanisms in order to provide a mechanical advantage between an input torque and an output torque. Thus, a transmission may be included to match properties of a motor, engine, turbine, or other torque generator (e.g., a torque-speed curve, an efficiency curve) to properties of an effector, a wheel, a generator, or some other intended application for a generated torque. For example, a transmission may be provided in an automobile to match the high rotational speed and relatively lower torque generated by an internal combustion engine to lower speed and higher torque requirements for driving the wheels of the automobile. In another example, a transmission may be provided to couple an internal combustion engine to a generator such that both the internal combustion engine and the generator are operated according to respective efficient rotational speeds.

A transmission may have a set transmission ratio (the ratio of the rotation speed and/or applied torque at an input of the transmission to the rotation speed and/or delivered torque at an output of the transmission) or may have a controllable transmission ratio. The transmission ratio of such a transmission may be controllable via electronic, mechanical, hydraulic, and/or other methodologies (e.g., via actuation of a clutch, slidable gear(s), split pulley, drum, turbine vane(s), hydraulic valve(s), or other elements of the transmission by a motor, solenoid, or other methodologies). In some examples, a transmission may have a discrete number of selectable transmission ratios (or "gears") that can be selected by operating one or more clutches or other actuators. In other examples, a transmission may have a transmission ratio that is continuously controllable across a range of transmission ratios; such transmissions may be referred to as "continuously variable transmissions." Such variable transmissions may include split pulleys, toroidal drums, hydrostatic elements, or other actuatable components to permit continuous control of the transmission ratio across the range of transmission ratios.

SUMMARY

In a first aspect, a transmission is provided that includes: (i) a first split pulley defining a first axis and comprising first and second half-pulleys, wherein the first half-pulley has a first contact surface that is radially symmetric about the first axis and that is concave, and wherein the second half-pulley has a second contact surface that is radially symmetric about the first axis and that is concave; (ii) a second split pulley defining a second axis and comprising third and fourth half-pulleys, wherein the third half-pulley has a third contact surface that is radially symmetric about the second axis and that is concave, wherein the fourth half-pulley has a fourth contact surface that is radially symmetric about the second axis and that is concave, and wherein the second pulley is nested within the first pulley; and (iii) a belt, wherein the belt is in contact with the first split pulley via the first and second contact surfaces and with the second split pulley via the third and fourth contact surfaces, wherein a torque applied to the second split pulley causes a torque to be realized at the first split pulley via a compressive force transmitted along the belt from the second split pulley to the first split pulley.

In a second aspect, a transmission is provided that includes: (i) a first split pulley defining a first axis and comprising first and second half-pulleys; (ii) a second split pulley defining a second axis and comprising third and fourth half-pulleys, wherein the second split pulley is nested within the first split pulley; and (iii) a belt, wherein the belt is in contact with the first split pulley and the second split pulley, wherein a couple between the first and second half-pulleys exerts forces onto the belt that are radially directed inward toward the first axis, wherein a couple the third and fourth half-pulleys exerts forces onto the belt that are radially directed inward toward the second axis, and wherein a torque applied to the second split pulley causes a torque to be realized at the first split pulley via a compressive force transmitted along the belt from the second split pulley to the first split pulley.

In a third aspect, a transmission having a controllable transmission ratio is provided that includes: (i) a first pulley defining a first axis, wherein the first pulley is a split pulley comprising first and second half-pulleys that are coupled to a mechanical ground such that the first pulley is prevented from rotating about the first axis; (ii) a second pulley defining a second axis, wherein the second pulley is nested within the first pulley, wherein the second pulley comprises third and fourth half pulleys that are rotatable about the second axis, and wherein the transmission is configured to control a transmission ratio of the transmission by adjusting a separation between the first and second half pulleys and a separation between the third and fourth half pulleys; (iii) a belt, wherein the belt is in contact with the first, second, third, and fourth half pulleys and wherein a torque applied to the second pulley causes a torque to be realized at the first pulley via a compressive force transmitted along the belt from the second pulley to the first pulley; (iv) an input member coupled to the second pulley such that rotation of the input member results in in movement of the second axis about the first axis; (v) an output member coupled to the second pulley such that rotation of the second pulley results in rotation of the output member and further such that a torque at the input member causes a torque to be realized at the output member; and (vi) a central gear that is coupled to the output member such that rotation of the central gear results in rotation of the output member, wherein the third and fourth half-pulleys comprise respective first and second ring gears having teeth that are in geared contact with the central gear such that rotation of the second pulley results in rotation of the central gear, and wherein the third and fourth half pulleys are arranged symmetrically about the central gear such that adjusting the separation between the third and fourth half pulley results in symmetrical motion of the third and fourth half pulleys toward or away from the central gear.

BRIEF DESCRIPTION OF THE DRAWINGS

FIG. 4C is a cross-sectional view of elements of the example transmission shown in FIG. 4A.

DETAILED DESCRIPTION

Figure 1:
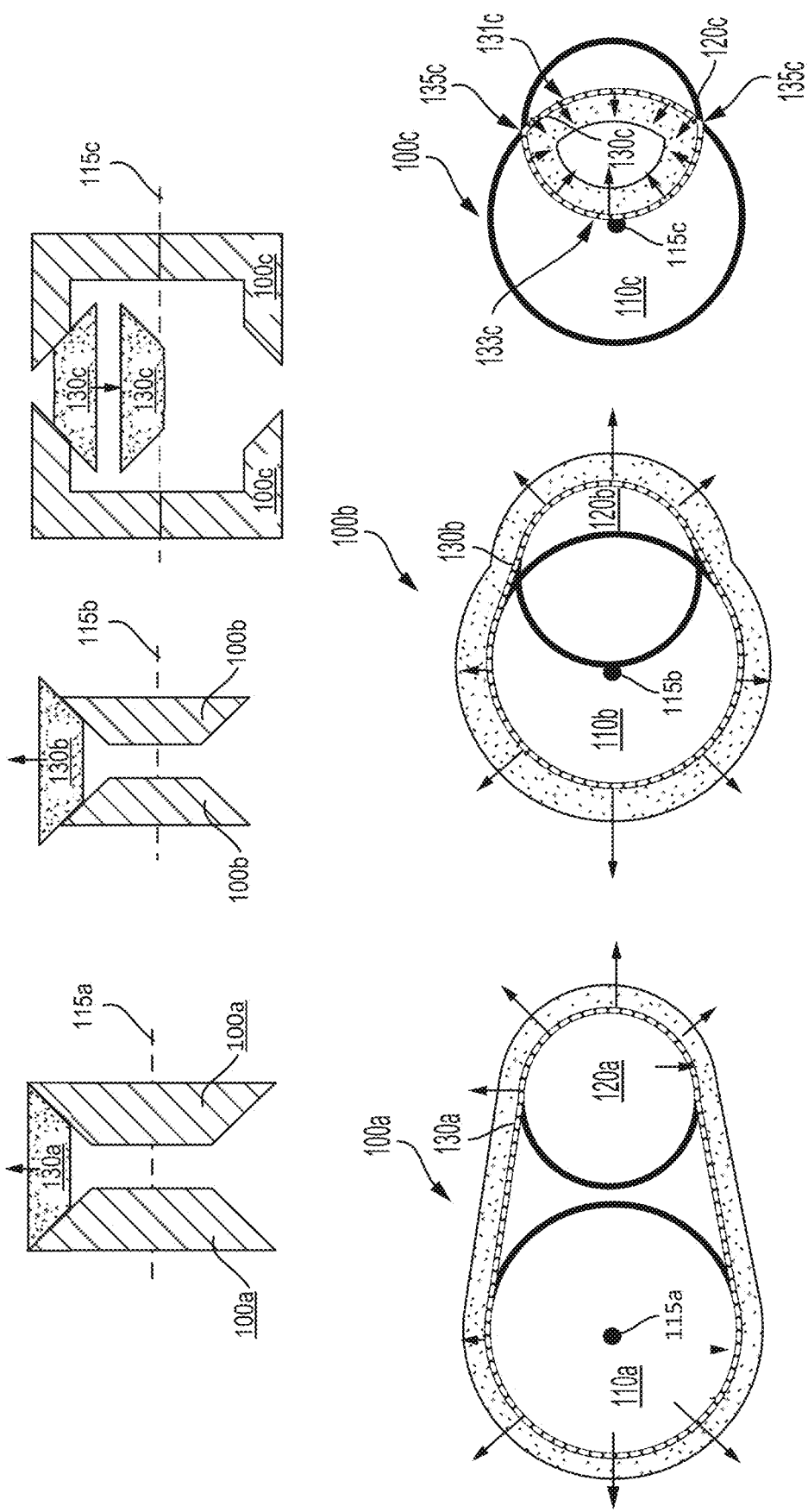
FIG. 1 depicts cross-sectional views of elements of several example transmissions.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Belt-and-pulley transmissions include two or more pulleys that engage with a belt. The transmission ratio of such a transmission may be static or variable. Power is transmitted from one pulley to the other via a length of the belt that travels between the pulleys. This power can be transmitted as a tensile force along the belt, or via compressive forces along the belt.

Pulleys of conventional belt-and-pulley transmissions engage with a belt by exerting forces onto the belt, via contact surfaces of the pulleys, that are radially directed 'outward' relative to the axis of the pulley rotation. That is, the forces directed onto the belt of such a transmission by a pulley of such a transmission have radial components (relative to the geometry of the pulley) that are directed outward, away from the axis of rotation of the pulley. For conventional transmissions that transmit power compressively via a push belt, the belt includes bands or other elements that are in tension in order to counter these 'outward' forces exerted onto the belt, which result in a net tensile force over portions of the length of the belt, thus keeping the belt engaged with the pulley. Such compressive transmissions are often preferred over transmissions that transmit power via tensile forces. However, the power capacity and lifetime of such compressive transmissions is often limited by the cost and complexity of push belts that are capable of withstanding the increased tension of high-power applications.

Improved transmissions described herein have 'radially inverted' pulleys that exert forces that are radially directed 'inward,' relative to the axes of the pulleys' rotation, onto a compressive, push-type belt. That is, the forces directed onto the belt of such improved transmissions by a pulley thereof have radial components (relative to the geometry of the pulley) that are directed inward, toward from the axis of rotation of the pulley. Accordingly, the belts of such transmissions are not under tension of a magnitude similar to the magnitude of the power-transmitting compression forces. Such belts can thus include band-packs (or other elements configured to resist tensile forces applied to the belt) exhibiting significantly reduced cost and complexity, or even omit such complex and expensive elements entirely.

In order for the 'radially inverted' pulleys of such a transmission to exert 'inward' forces onto a belt, the pulleys can be nested within each other or otherwise configured such that they at least partially overlap. Elements of a first pulley of such a transmission (which may be a split-pulley to permit variation in the transmission ratio) can be located within or between elements of a second pulley, which is split to permit the overlapping configuration. In some examples, one or both of the axes of rotation of the pulleys of such a transmission could move relative to each other and/or to a mechanism or system of which they are a part. For example, the first pulley in such a transmission may engage in trochoidal motion within the transmission, rotating about an axis of rotation that, itself, orbits about a central axis of rotation of the transmission and/or of a second pulley at a specified distance from the central axis of rotation. The first pulley of such a transmission could be driven by an input member (e.g., via an off-center cam), and power can be extracted from the first pulley via an offset shaft coupling or some other mechanism. In another example, the locations of the axes of rotation of the pulleys of such a transmission could be fixed. For example, both pulleys could have offset axes of rotation that do not move relative to a mechanism or system of which they are a part (e.g., an outer pulley could have a very wide throat or other opening to permit an axle of an inner pulley to pass through).

II. Example Transmissions

A variety of transmissions provide a static or variable transmission ratio between an input and an output by transmitting forces from one (or more) pulleys to another pulley via a belt that is in contact with both of the pulleys. Differences in the effective diameter of the pulleys allow the transmission to exhibit a non-unity transmission ratio (i.e., a transmission ratio that is greater than one or less than one). The pulley(s) may be split or otherwise configured such that their effective diameter(s) can be adjusted, thereby allowing the transmission ratio of the transmission to be adjusted. Power can be transferred between the pulleys via tensile forces in the belt, or via compressive forces (e.g., using a 'push-type' belt).

FIG. 1 illustrates a variety of such belt-and-pulley transmissions. A first transmission 100a includes first 110a and second 120a pulleys. A belt 130a wraps around the pulleys 110a, 120a. Outward forces (illustrated by the arrows in FIG. 1) exerted from the pulleys 110a, 120a onto the belt 130a (e.g., exerted from the first pulley 110a in a direction radially away from an axis of rotation 115a of the first pulley 110a such that a radial component of the exerted force, relative to the geometry of the pulley 110a, is directed outward, away from the axis 115a of the pulley 110a) allow the belt 130a to resist slipping on contact surfaces of the pulleys 110a, 120a, allowing power (torques and/or rotations) applied to one of the pulleys to be transmitted, via the belt 130a, to the other pulley. One or both of the pulleys 110a, 120a could be split pulleys and configured to allow the axial separation between the halves of the split pulleys to be adjusted, thereby controlling the transmission ratio of the transmission 100a. The lower half of FIG. 1 illustrates the transmission 100a in cross-section through the plane of the belt 130a, while the upper half of FIG. 1 illustrates the transmission 100a in cross-section through a plane passing through the axis of rotation 115a of the pulley 110a and depicts only the first pulley 110a and the portion of the belt 130a in contact therewith.

The pulleys of a belt-and-pulley transmission can be nested or otherwise made to partially overlap with each other to provide a variety of benefits. These benefits can include reduced size, increased transmission ratios, smaller changes in the axial separation of split pulley halves effecting greater changes in the transmission ratio of the transmission (where the transmission is a variable transmission utilizing split pulleys to adjust its ratio), increased speed in shifting the transmission ratio, or other benefits relative to a non-overlapping configuration. Such an overlapping transmission can include an 'outer' pulley that is split into two halves, to allow the elements of an 'inner' pulley to be located between the outer two halves, allowing the belt to contact both the inner and outer pulleys despite their overlapping with each other.

The pulleys of such a nested transmission may rotate about axes that are static (i.e., that do not move in space relative to a ground, housing, or other structural elements of the transmission). Alternatively, the axis of rotation of one or both of the pulleys (e.g., the inner pulley) could move. For example, the axis of rotation of the inner pulley could orbit about the axis of rotation of the outer pulley, such that the inner pulley engages in a trochoidal motion.

A second transmission 100b depicted in FIG. 1 is an example of such a nested-pulley transmission. The second transmission 100b includes first 110b and second 120b pulleys. A belt 130b wraps around the pulleys 110b, 120b. Outward forces (illustrated by the arrows in FIG. 1) exerted from the pulleys 110b, 120b onto the belt 130b (e.g., exerted from the first pulley 110b in a direction away from an axis of rotation 115b of the first pulley 110b such that a radial component of the exerted force, relative to the geometry of the pulley 110b, is directed outward, away from axis 115b of the pulley 110c) allow the belt 130b to resist slipping on contact surfaces of the pulleys 110b, 120b, allowing power (forces and/or rotations) applied to one of the pulleys to be transmitted, via the belt 130b, to the other pulley. One of the pulleys (e.g., 110b) could be split into two half-pulleys disposed opposite elements of the other one of the pulleys (e.g., 120b) to allow both pulleys to rotate and for the belt 130b to pass from the contact surfaces of one pulley to the other. Contact surfaces of the pulleys 110b, 120b, in order to exert such radially 'outward' forces onto the belt 130b, have surface normals that are directed radially inward toward the respective axes of rotation of the pulleys 110b, 120b. Accordingly, the contact surfaces of the pulleys 110b, 120b are convex.

Both of the pulleys 110b, 120b could be split pulleys and configured to allow the axial separation between the halves of the split pulleys to be adjusted, thereby controlling the transmission ratio of the transmission 100b. The lower half of FIG. 1 illustrates the transmission 100b in cross-section through the plane of the belt 130b, while the upper half of FIG. 1 illustrates the transmission 100b in cross-section through a plane passing through the axis of rotation 115b of the pulley 110b and depicts only the first pulley 110b and the portion of the belt 130b in contact therewith (portions of the second pulley 120b over which the first pulley 110b may overlap are omitted from the upper portion of FIG. 1).

Configuring a transmission in the manner of example transmissions 100a, 100b, with the pulleys exerting forces outward from their axes of rotation onto a belt that wraps around the pulleys, can provide a variety of benefits and drawbacks. Where the belt is configured to transmit forces between the pulleys via tensile forces within the belt (e.g., the belt is a "pull type" belt), increases in the transmitted power result in increases in the normal forces exerted on the belt, reducing the chance that the belt slips against the pulley(s).

In some examples, it is preferable to use a belt that is configured to transmit forces between the pulleys via compressive forces within the belt (e.g., the belt is a "push type" belt). Such a method of power transmission through the belt could be selected in order to improve the efficiency, reduce the noise and vibration, or other features of the transmission. However, when such a belt is employed with pulleys that exert 'outward-facing' forces onto the belt, the belt typically includes straps, band packs, hinges, multi-bar links, or other elements to transmit substantially static tensile loads along the belt. The magnitude of these tensile loads is tailored to ensure that the normal force exerted by the pulleys onto the belt is sufficient to prevent slippage of the belt relative to the contact surfaces of the pulleys. Accordingly, increases in the power capacity of such a transmission are accompanied by increases in the tensile load the belt must withstand, increasing the cost, mass, volume, and/or complexity of the belt. Further, increases in the power transmitted through such a "push belt" result in decreases in the normal forces exerted on the belt (due to the increased compressive, power-transmitting forces cancelling more of the substantially static tensile forces within the belt), increasing the chance that the belt slips against the pulley(s) and leading to potential instability as the transmitted power increases.

The pulleys of an overlapping-pulley type belt-and-pulley transmission define an area that is completely enclosed by the effective circumferences of the pulleys. Accordingly, such an overlapping-pulley type transmission can be configured to exert forces onto a belt 'inward' toward their axes of rotation. The belt would thus be under compression everywhere, and so could omit (or include fewer, smaller, and/or less costly) tension-transmitting elements to maintain the integrity of the belt and/or the alignment of segments thereof.

A third transmission 100c depicted in FIG. 1 is an example of such a nested-pulley transmission wherein the pulleys exert 'inward' forces onto a belt. The third transmission 100c includes first 110c and second 120c pulleys. A belt 130c is disposed within the area defined by the overlapping effective circumferences of the pulleys 110c, 120c. Inward forces (illustrated by the arrows in FIG. 1) exerted from the pulleys 110c, 120c onto the belt 130c (e.g., exerted from the first pulley 110c in a direction toward an axis of rotation 115c of the first pulley 110c such that a radial component of the exerted force, relative to the geometry of the pulley 110c, is directed inward, toward the axis 115c of the pulley 110c) allow the belt 130c to resist slipping on contact surfaces of the pulleys 110c, 120c, allowing power (forces and/or rotations) applied to one of the pulleys to be transmitted, via the belt 130c, to the other pulley. The belt 130c is in contact with the first pulley 110c along a first contact surface 131c and with the second pulley 120c via a second contact surface 133c. The contact surfaces 131c, 133c of the pulleys 110c, 120c, in order to exert such radially 'inward' forces onto the belt 130c, have surface normals that are directed radially inward toward the respective axes of rotation of the pulleys 110c, 120c. Accordingly, the contact surface 131c, 133c of the pulleys 110c, 120c are concave. The lower half of FIG. 1 illustrates the transmission 100c in cross-section through the plane of the belt 130c, while the upper half of FIG. 1 illustrates the transmission 100c in cross-section through a plane passing through the axis of rotation 115c of the pulley 110c and depicts only the first pulley 110c and belt 130c (portions of the second pulley 120c over which the first pulley 110c may overlap are omitted from the upper portion of FIG. 1 for purposes of clearer illustration).

Most of the length of the belt 130c (e.g., most of the discrete segments of a multi-segment belt) is in contact with one or the other of the contact surfaces 131c, 133c. However, two portions 135c of the belt are 'floating,' such that they are not in contact with either pulley 110c, 120c. These 'floating' portions are those portions of the belt that move between contact with one of the pulleys to contact with the other.

One of the pulleys (e.g., 110c) could be split into two half-pulleys that are positioned opposite elements of the other one of the pulleys (e.g., 120c). This configuration allows both pulleys to rotate and allows the belt 130c to pass from the contact surfaces of one pulley to the other. Both of the pulleys 110c, 120c could be split pulleys and configured to allow the axial separation between the halves of the split pulleys to be adjusted, thereby controlling the transmission ratio of the transmission 100c.

Such a transmission, exerting inward-facing forces onto a belt and thus reducing or eliminating the need for tension-sustaining elements of the belt, could be implemented in a variety of ways. One or both of the pulleys could be split-pulleys, with the separation(s) between the half-pulleys of the split-pulley(s) being controllable to control a transmission ratio of the transmission. In some examples, both of the pulleys of a transmission as described herein could rotate about respective axes of rotation which are, themselves, nonmoving within the transmission. Alternatively, one of the pulleys could be mechanically grounded while the axis of rotation of the other pulley could orbit about the axis of symmetry of the grounded pulley, with the orbiting of the axis of rotation being an input of the transmission and the overall rotation of the orbiting pulley about its axis being an output of the transmission (e.g., the transmission could be configured as a cycloidal variety of transmission). Where one of the pulleys is configured to 'orbit' in this manner, a variety of mechanisms could be employed to drive the transmission and/or to rectify the motion of the orbiting pulley to provide an output, or vice versa. For example, the motion of the axis of rotation of the inner pulley could be driven by an input member coupled to an off-center cam that is rotatably coupled to the inner pulley. A balancing mass could also be coupled to the cam and/or input member to offset the movement of the off-center mass of the inner pulley as the inner pulley's axis of rotation orbits within the transmission. The rotation of the inner pulley about its axis of rotation could be coupled (or 'rectified') to an output member using a set of individual pins (surrounded by bearings) penetrating into corresponding holes or other features in the inner pulley. Other methods for coupling rotations/torques into/out of the elements of such a transmission are possible.

The configuration of a belt of such a transmission could also be selected from a variety of possibilities to access desired benefits or trade-offs. For example, the belt could have an "A"-shaped cross-section (i.e., with all contact surfaces via which the belt contacts the pulleys facing away from each other), with both split-pulleys exerting compressive local forces onto the belt (e.g., onto individual segments of the belt) in order to drive the belt and prevent slippage of the belt relative to the pulleys. In another example, the belt could have an "M"-shaped cross-section (i.e., some of the belt's pulley-contacting surfaces face toward each other, and some face away from each other), with one of the split-pulleys exerting compressive local forces onto the belt (e.g., the 'inner' pulley in contact with the belt contact surfaces that face away from each other) and the other exerting tensile/expanding local forces onto the belt in order to drive the belt and prevent slippage of the belt relative to the pulleys (e.g., the 'outer' pulley in contact with the belt contact surfaces that face toward each other). The use of an "M-belt" could provide for smaller, shorter, and/or lighter transmissions than the use of an "A-belt," while potentially increasing the complexity of fabrication of the transmission, imposing higher manufacturing requirements for the materials and fabrication of the belt (e.g., requiring the use of materials that can endure higher tensile loads and/or repeating alternation of compressive and tensile loads), or imposing some other differing factors with respect to manufacturing or operation of the transmission.

Figure 2:
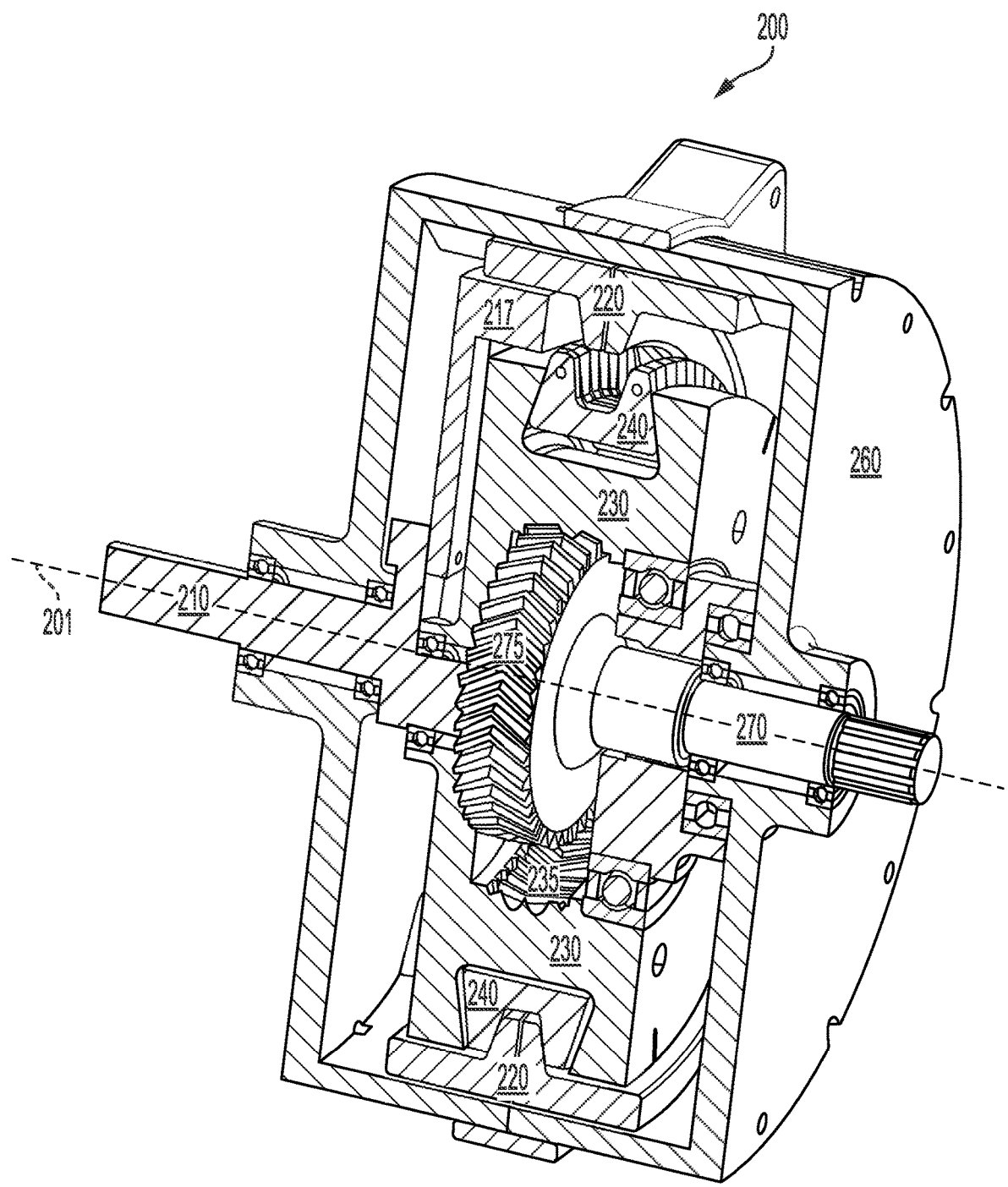
FIG. 2 is a cross-sectional perspective view of elements of an example variable transmission.

FIG. 2 shows, in cross-section, elements of an example transmission 200 in which the pulleys exert radially 'inward' forces onto a belt and wherein the axis of one of the pulleys 'orbits' around the axis of rotation of the other pulley. The transmission 200 includes an inner pulley 230, an outer split pulley 220, and a belt 240. A first portion of the belt 240 (shown in the upper portion in FIG. 2) is in contact with the inner pulley 230 and a second portion of the belt 240 (shown in the lower portion in FIG. 2) is in contact with the outer split pulley 220. An input member 210 couples torques/rotations into/out of the transmission 200, causing the inner pulley 230 to process by rotating about a cam 215 that rotates about a central axis 201 (which is also the axis of symmetry of the belt-contacting surfaces of the outer split pulley 220) as the input member 210 rotates. A counter-weight 217 is also coupled to the input member 210 to compensate for the motion of the inner pulley's 230 center of mass about the axis 201. The outer split pulley 220 is mechanically coupled to a mechanical ground 260 (e.g., a housing) of the transmission 200 such that it is prevented from rotating relative to the ground 260. An output member 270 couples torques/rotations out of/into the transmission 200 by being coupled, via a gear 275, to a toothed contact surface 235 of the inner pulley 230. Thus, the application of a rotation/torque at the input member 210 results in the realization of a rotation/torque at the output member 270, and vice versa.

The inner pulley 230 of the example transmission 200 is non-split and so has a non-adjustable effective diameter with respect to its contact with the belt 240. Accordingly, the transmission 200 has a fixed transmission ratio. The axial separation between the halves of the split outer pulley 220 could be statically set or could be continuously adjusted (e.g., to optimize a tension in the belt 240 across different torque and/or power conditions). However, in some examples, the inner pulley could also be split. In such an example, the axial distances between the halves of the inner and outer split pulleys could be adjusted to control the transmission ratio of the transmission and/or to control a level of tension in the belt.

In some examples, the inner pulley 230 could be split symmetrically about a center plane of the gear 275. In such examples, the angle, geometry, number, or other properties of chevron- or "V"-shaped teeth of the gear 275 could be specified such that the interaction between the gear 275 and the toothed contact surface 235 of the inner pulley 230 provides a negative feedback with respect to the tension in the belt 240. This approach beneficially simplifies the control of the transmission 240 with fewer actuators. For example, the transmission 240 could be configured such that increase power transmission through the transmission 200 results in increase force exerted to draw the halves of the inner pulley 230 together, thereby increasing the inward-facing forces exerted by the inner pulley 230 onto the belt 240 and reducing the chance that the belt 240 slips against the pulleys 220, 230. This could be implemented in examples of the transmission 200 having static or dynamically-controllable transmission ratios. Note that such a mechanism could be beneficially applied to transmissions wherein the pulleys of the transmission exert 'conventional' outward-facing forces onto the belt (e.g., transmissions wherein the belt includes band packs or other tensile elements configured to transmit large tensile loads along the belt, thereby allowing large outward-facing forces to be exerted onto the belt such that large loads can be transmitted from one pulley to the other without the belt slipping). Such application could include reversing the direction of the "V"-shaped teeth such that the beneficial relationship between transmitted torque and belt tension (resulting from forces applied to the belt in a radially-outward direction) is obtained.

Note that the use of a gear having "V"-shaped teeth above is intended as a non-limiting example embodiment. A central gear having teeth shaped in some other manner (e.g., flat teeth) that are shaped such that half-pulleys toothed to engage therewith can move symmetrically, in an axial direction, toward/away from a center plane through the gear.

As shown in FIG. 2, the belt 240 has an "M"-shaped cross-section. Accordingly, as depicted in FIG. 2, the outer split pulley 220 exerts tensile/expanding local forces onto the belt via contact surfaces on the belt that face toward each other while the inner split pulley 230 exerts compressive local forces onto the belt via contact surfaces on the belt the face away from each other. However, a transmission as described herein, having nested or otherwise overlapping pulleys configured to exert 'inward' forces onto a belt, could also be implemented using a belt having a "A"-shaped cross-section, or other cross-sectional shape.

Further, the coupling between the inner member 210 and the inner pulley 230 and/or output member 270 and the inner pulley 230 (i.e., using a gear 275 in contact with a toothed contact surface 235 within the inner pulley 230) could be modified. For example, the output member 270 could be rotatably coupled to the inner pulley 230 using an offset shaft coupling, a cycloidal transmission, or some other variety of coupling.

Additionally, while the transmissions described herein (e.g., 200, 300, 400) are characterized as including inputs from which power is transmitted to outputs, these transmissions may additionally or alternatively be configured to be back-drivable or otherwise configured to permit bidirectional energy transmission and/or energy transmission from output(s) to input(s). For example, transmissions as described herein could be used to bidirectionally transfer energy between joints of a robot, e.g., to increase the overall efficiency of the robot by permitting energy to be harvested from one joint (e.g., a joint currently receiving energy from, e.g., contact with the ground) and applied to another joint (e.g., a joint currently being employed to exert force on a payload), or vice versa. Additionally, such a configuration could permit multiple degrees of freedom (e.g., of one or more joints of a robot) to be driven by a single motor (e.g., via respective nested-pulley infinitely variable transmissions.

Yet further, such a transmission could include more than one inner pulley and/or more than one outer pulley. For example, such a transmission could include multiple inner pulleys arranged uniformly about a center axis such that the motion of their centers of mass about the center axis cancel, thereby reducing vibration, the magnitude of reaction forces transmitted through bearings, or providing some other benefit.

Figure 3B:
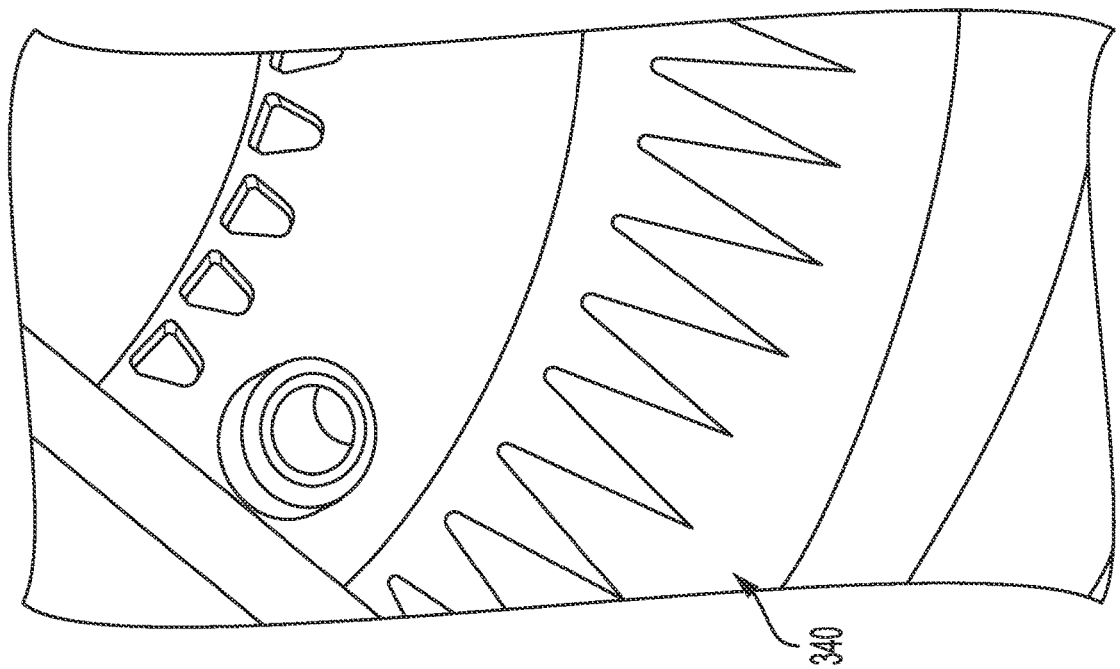
FIG. 3B is another photograph of the physical model of the example transmission shown in FIG. 3A.
Figure 3A:
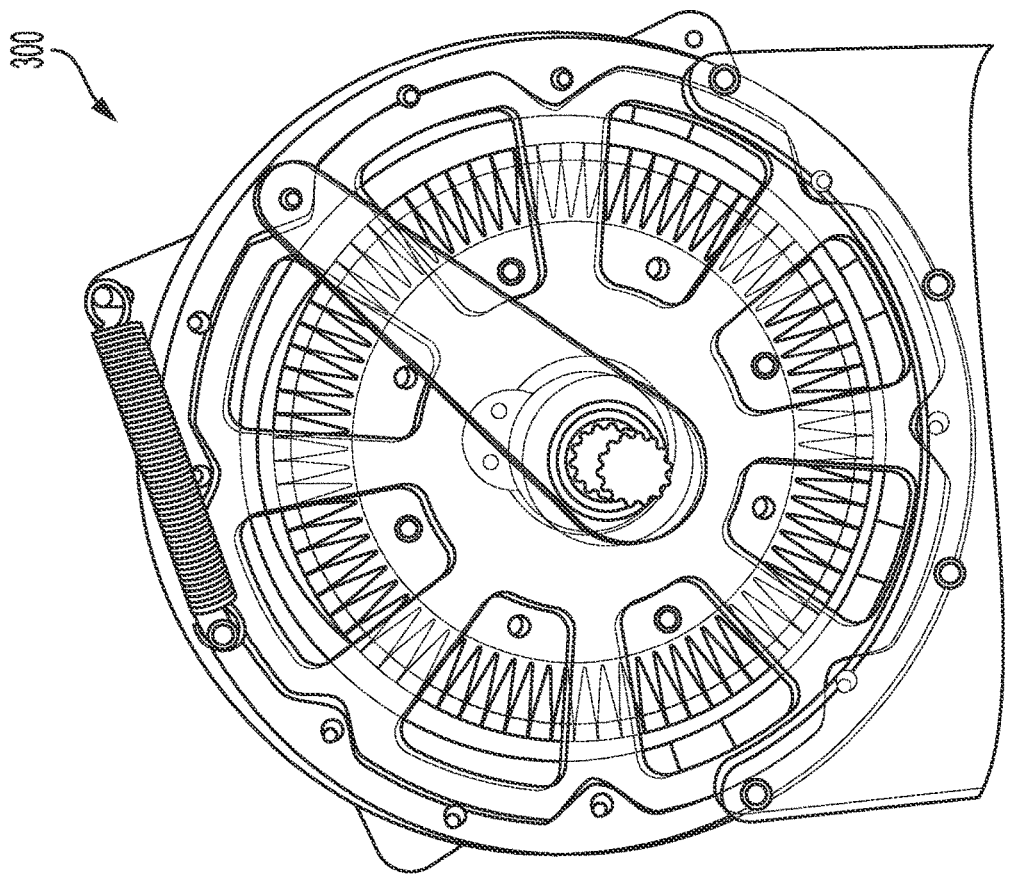
FIG. 3A is a photograph of a physical model of an example transmission.

FIGS. 3A and 3B are photographs of a transmission 300 that includes pulleys that exert forces 'inward' onto a belt that is everywhere in compression. FIG. 3A depicts the whole transmission 300. FIG. 3B depicts a portion of the transmission 300 in a close-up, backlit manner to show the shape and arrangement of discrete elements of a belt 340 of the transmission 300.

Figure 4A:
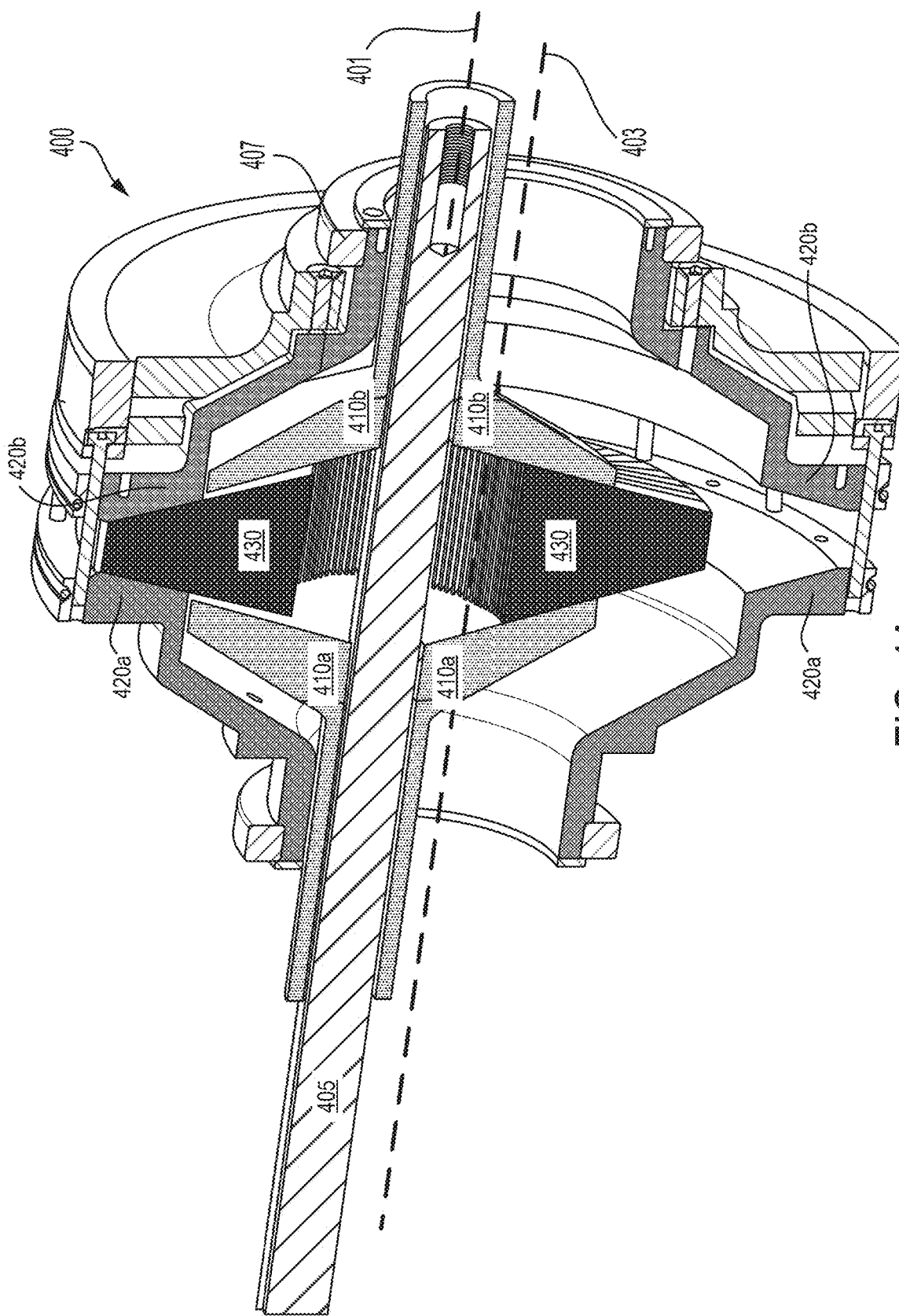
FIG. 4A is a cross-sectional perspective view of elements of an example variable transmission.

FIG. 4A shows, in perspective cross-section, elements of an example transmission 400 in which the pulleys exert 'inward' forces onto a belt and wherein the axes of rotation of the pulleys are static with respect to the transmission 400 as a whole. The transmission 400 includes an inner split pulley 410 (comprising first 410a and second 410b half-pulleys) that rotates about a first axis of rotation 401, an outer split pulley 420 (comprising first 420a and second 420b half-pulleys) that rotates about a second axis of rotation 403), and a belt 430. As shown, the axial distances between the half-pulleys of the outer 420 and inner 410 split-pulleys are controllable to, e.g., effect a change in the transmission ratio of the transmission, to adjust a tension in the 430, and/or to provide some other benefits. A first portion of the belt 430 (shown in the upper portion in FIG. 4) is in contact with the outer half-pulleys 420a, 420b and a second portion of the belt 430 (shown in the lower portion in FIG. 4) is in contact with the inner half-pulleys 410a, 410b. An input member 405 couples torques/rotations into/out of the transmission 400, causing the inner split pulley 410 to rotate about the first axis 401 as the input member 405 rotates. An output member 407 couples torques/rotations into/out of the transmission 400, causing the outer split pulley 420 to rotate about the second axis 403 as the output member 407 rotates. Thus, the application of a rotation/torque at the input member 405 results in the realization of a rotation/torque at the output member 407, and vice versa.

Figure 4B:
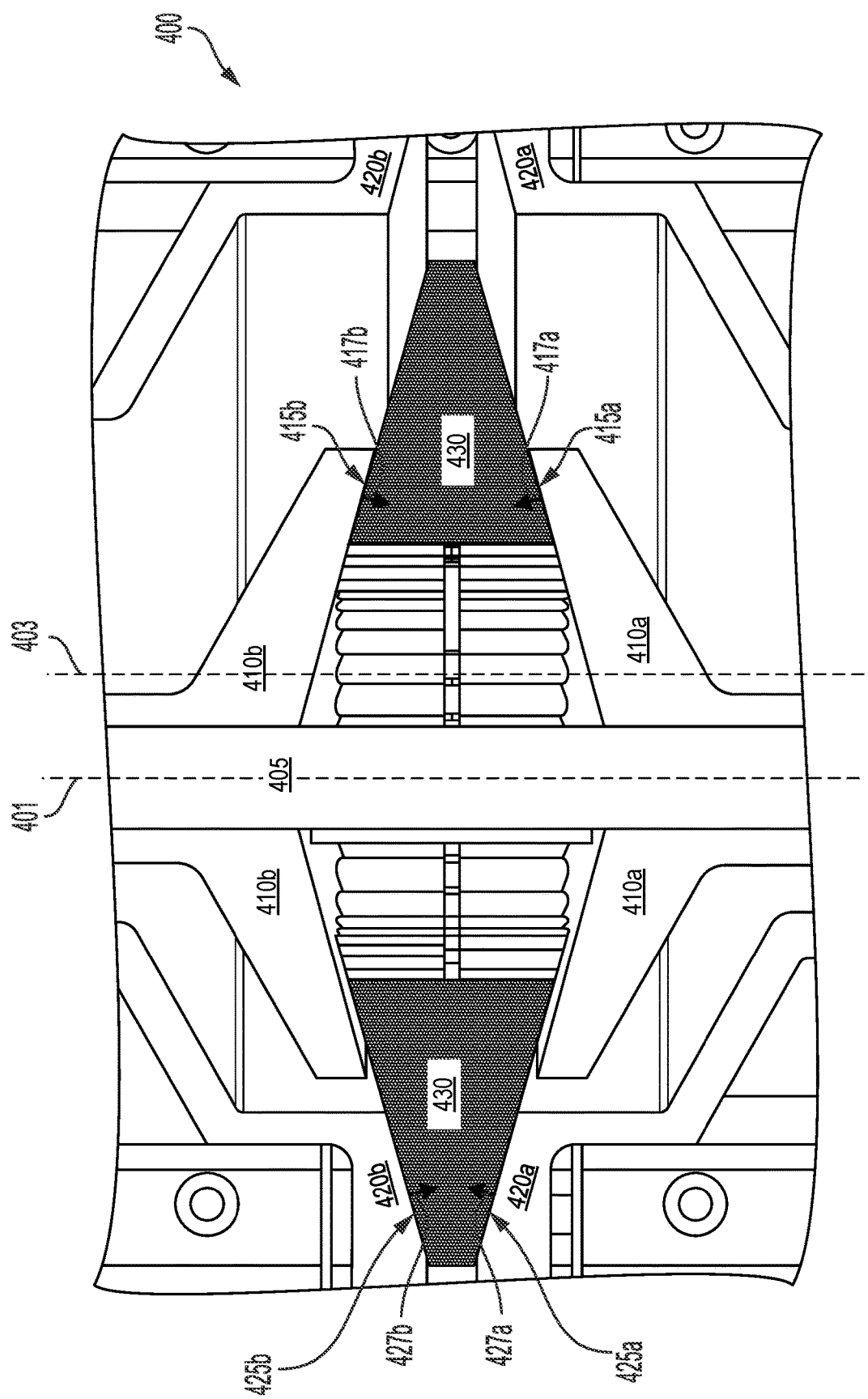
FIG. 4B is a cross-sectional view of elements of the example transmission shown in FIG. 4A.

The axial separation between the half-pulleys 410a, 410b of the inner split pulley 410 and the axial separation between the half-pulleys 420a, 420b of the inner split pulley 420 could be adjusted in order to control the transmission ratio of the transmission. This can be effected by adjusting the axial separations of the inner 410 and outer 420 split pulleys such that the locations along the inner 410 and outer 420 split pulleys at which the belt 430 contacts the inner 410 and outer 420 split pulleys changes, thereby adjusting the effective diameters of the inner 410 and outer 420 split pulleys with respect to their interaction with the belt 430. For example, FIG. 4B illustrates the transmission 400 when the axial separations have been adjusted to effect a reduction or underdrive ratio. The separation between the inner half-pulleys 410a, 410b has decreased, allowing the belt 430 to contact the contact surfaces 415a, 415b of the inner half-pulleys 410a, 410b closer to the first axis 401, leading to a reduction in the effective diameter of the inner split pulley 410; in contrast, the separation between the outer half-pulleys 420a, 420b has increased, allowing the belt 430 to contact the contact surfaces 425a, 425b of the outer half-pulleys 420a, 420b farther from the second axis 403, leading to an increase in the effective diameter of the outer split pulley 420. In another example, FIG. 4C illustrates the transmission 400 when the axial separations have been adjusted to effect an overdrive ratio. The separation between the inner half-pulleys 410a, 410b has increased, allowing the belt 430 to contact the contact surfaces 415a, 415b of the inner half-pulleys 410a, 410b farther from the first axis 401, leading to an increase in the effective diameter of the inner split pulley 410; in contrast, the separation between the outer half-pulleys 420a, 420b has decreased, allowing the belt 430 to contact the contact surfaces 425a, 425b of the outer half-pulleys 420a, 420b closer to the second axis 403, leading to a decrease in the effective diameter of the outer split pulley 420.

FIG. 4B depicts in detail the forces exerted by the pulleys of the transmission 400 onto the belt 430). In particular, the contact surfaces 425a, 425b of the outer half-pulleys 420a, 420b exert respective forces 427a, 427b onto the belt 430 and the contact surfaces 415a, 415b of the inner half-pulleys 410a, 410b exert respective forces 417a, 417b onto the belt 430. Note that the forces 417a, 417b, 427a, 427b may have components directed into/out of the plane of FIG. 4B (not shown); such components are "tangential" components relative to the cylindrical geometry of the respective half-pulley 410a, 410b, 420a, 420b. Components of the forces 417a, 417b, 427a, 427b directed parallel to the axis of rotation 410, 403 of the respective half-pulley 410a, 410b, 420a, 420b are "axial" components relative to the cylindrical geometry of the respective half-pulley 410a, 410b, 420a, 420b. Components of the forces 417a, 417b, 427a, 427b directed perpendicular to the axis of rotation 410, 403 of the respective half-pulley 410a, 410b, 420a, 420b and in the plane of FIG. 4B are "radial" components relative to the cylindrical geometry of the respective half-pulley 410a, 410b, 420a, 420b. Thus, the forces exerted by the half-pulleys 410a, 410b, 420a, 420b are all radially directed 'inward' in that they all have radial components that are directed inward toward the respective axis of rotation 410, 403 of the respective half-pulley 410a, 410b, 420a, 420b.

As shown in FIG. 4B, the pair of half-pulleys forming each split pulley exert a pair of forces onto the belt that represent a compressive force couple between the half-pulleys. So, the forces 427a, 427b exerted by the outer half-pulleys 420a, 420b onto the belt form a compressive couple that acts to exert a compressive force onto the belt 430 (since the axial components of the forces 427a, 427b are directed toward each other) and a radially inward-directed force onto the belt 430, as well as potentially a tangential force onto the belt 430. Similarly, the forces 417a, 417b exerted by the inner half-pulleys 410a, 410b onto the belt form a compressive couple that acts to exert a compressive force onto the belt 430 (since the axial components of the forces 417a, 417b are directed toward each other) and a radially inward-directed force onto the belt 430, as well as potentially a tangential force onto the belt 430. However, as noted elsewhere herein (e.g., in connection with the transmission 200 depicted in FIG. 2), such couples, exerted in a radially inward direction onto a belt, may be exerted away from each other, onto contact surfaces of a belt that face toward each other, thereby exerting a tensile force onto the belt (as well as the inward-facing radial force and optionally a tangential force).

In order to exert such radially 'inward' forces onto the belt 430, the contact surfaces 415a, 415b, 425a, 425b have surface normals that are directed radially inward toward the respective axis of rotation 410, 403 of the respective half-pulley 410a, 410b, 420a, 420b. That is, the local surface normal of any portion of any of the contact surfaces 415a, 415b, 425a, 425b has a radial component that is in the plane of FIG. 4B and perpendicular to the axes of rotation 401, 403 and that is directed inward toward the corresponding axis of rotation 401, 403. The axial component of the local surface normal of any portion of any of the contact surfaces 415a, 415b, 425a, 425b may have a direction that is appropriate to facilitate exertion of compressive forces onto the belt in order to maintain non-slipping contact between the belt 430 and the contact surface (e.g., the axial component of the surface normal for portions of the contact surface 415a of the first half-pulley 410a is directed 'upward' in the view of FIG. 4B, while the axial component of the surface normal for portions of the contact surface 415b of the second half-pulley 410b is directed 'downward' in the view of FIG. 4B). Accordingly, the contact surfaces 415a, 415b, 425a, 425b of the half-pulleys 410a, 410b, 420a, 420b are concave.

As shown in FIGS. 4A-C, the belt 430 has an "A"-shaped cross-section. Accordingly, as depicted in FIGS. 4A-C, the outer split pulley 420 exerts compressive local forces onto the belt 430 (via contact surfaces of the belt 430 that face away from each other) and the inner split pulley 410 also exerts compressive local forces onto the belt (via contact surfaces of the belt 430 that face away from each other). However, a transmission as described herein, having nested or otherwise overlapping pulleys configured to exert 'inward' forces onto a belt, could also be implemented using a belt having an "M"-shaped cross-section, or other cross-sectional shape.

The belt of a transmission as described herein (e.g., 100c, 200, 300, 400), having pulleys that exert inward-facing forces onto the belt, could be configured in a variety of ways to facilitate efficient, low-ripple transmission of power from one pulley to another over extended periods of operational lifetime and for high magnitudes of transmitted power. Such a belt could include a plurality of segments stacked together within the transmission, with (at a particular point in time) a first subset of the segments in contact with a first, inner pulley, a second subset of the segments in contact with a second, outer pulley, and a third subset of the segments that are not in contact with any pulley but transmitting, via compressive loads, power from the first pulley to the second pulley (such a transmission would also include a fourth subset of the segments that are not in contact with any pulley and that are not compressively transmitting power but merely transitioning back from the pulley being driven to the driving pulley). A cross-sectional shape of the segments through a plane perpendicular to the axes of rotation of the pulley(s) could be circular, elliptical, or some other shape specified such that the segments engage with each other in substantially pure rolling motion, increasing the efficiency of the transmission and increasing the operational lifetime of the belt and/or transmission. Because the belt of such a transmission, which direct forces inward onto the belt, can be everywhere in compression, band packs or other elements that are present in other transmissions to maintain a static tensile force along the belt could be reduced or omitted entirely.

Such a belt could include features to maintain the segments of the belt in proper alignment despite shocks, vibration, particulates in the transmission, imperfections in the elements of the transmission (e.g., imperfections in the pulleys, imperfections in the belt segments), or other processes or factors that might lead to the segments moving out of alignment with each other and/or with the pulleys of a transmission. For example, each segment could include one or more hemispherical or otherwise-shaped protruding features configured to seat within corresponding features (e.g., hemispherical hollows) on neighboring segments. Such features could, during normal operation of the transmission, engage with each other in manners other than pure rolling motion (e.g., sliding motion). However, the segments could be shaped such that the majority of the compressive force through the belt is transmitted via other aspects of the segments (e.g., via larger surfaces shaped to engage with each other via substantially pure rolling motion), such that the non-pure rolling motion of the alignment features relative to each other do not significantly negatively impact efficiency or operational lifetime of the belt and/or transmission. Additionally or alternatively, such a belt could include straps or other features to maintain the alignment of the segments while permitting the segments to roll against each other as the transmission operates. Such straps or other features could be arranged between/around the segments in a woven arrangement (e.g., with the metal, fabric, or other material bands acting as a 'warp' and the load-bearing segments of the belt acting as a 'weft'). Because the straps or other features would act to counter small misaligning forces, rather than to maintain a large, static tension sufficient to counter the power-transmitting compression through the belt, the straps or other features could be smaller, lighter, lower cost, or otherwise improved relative to the tensile band-packs of conventional push-type belts.

As noted above, a cross-sectional shape of the segments through a plane perpendicular to the direction along which the belt transmits force could be "A"-shaped, "M"-shaped, or some other shape specified such that the segments contact the pulleys of the transmission without slipping. The particular configuration of the belt segments could be specified to obtain a desired size, volume, weight, cost, complexity of fabrication, lifetime, material composition or specification, transmission ratio or range of controllable transmission ratio, efficiency, generated vibration or noise vibration harshness, or some other desired constraint of the belt and/or of the transmission.

Figure 6:
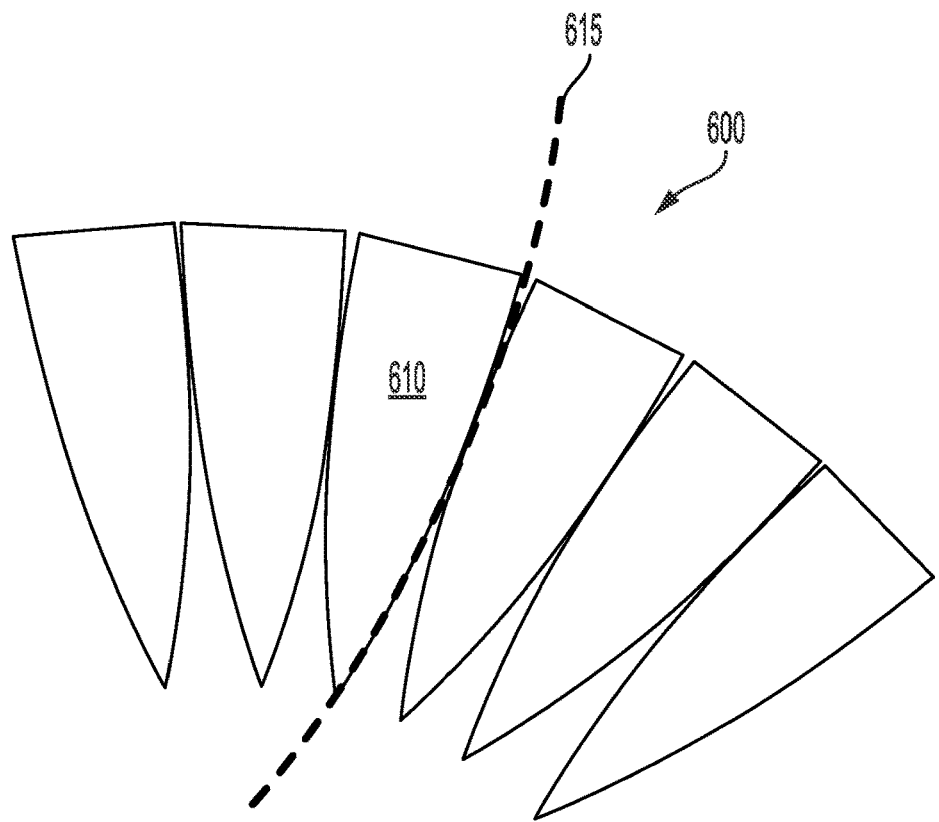
FIG. 6 is a cross-sectional view of elements of a belt.

FIG. 6 depicts a cross-section of a number of segments (including example segment 610) of an example belt 600 (e.g., an M-belt, an A-belt) as described herein. The plane of the cross-sectional view is perpendicular to the length of the belt 600 and to the axes of rotation of the pulleys with which the belt 600 is in contact. Each segment has contact surfaces (e.g., surface 615 of segment 610) that contact and transmit forces to and from neighboring segments. The shape of such contact surfaces (e.g., 615) can be circular, elliptical, or other specified shapes such that the segments engage with each other via substantially pure rolling motion. Accordingly, substantially all of the compressive force transmitted along the belt from one pulley to the next could be transmitted via such contact surfaces that engage with each other via rolling motion (e.g., greater than 90% of the compressive force transmitted along the belt from one pulley to the next could be transmitted via such rolling-motion contact surfaces). The shape of the contact surfaces could also be specified to minimize velocity ripple, to stabilize sections of the belt that are "floating" between contact with one or the other pulley of a transmission, or to provide some other benefits. The thickness of the segments could be reduced in order to decrease Hertzian contact forces, thereby increasing load and stiffness.

In a conventional belt-and-pulley transmission that includes a multi-segment belt, differences between the location of contact of the segments with a pulley and the location of transmission of tension/compression forces between adjacent segments can result in a net moment imparted onto the segments. This net moment can result in skewing of the segments relative to the pulleys, reducing efficiency and maximum power transfer, increasing wear, and reducing device lifetime. However, the segments of a belt of an inward-facing transmission as described herein, when configured to include features that constrain the belt segments to engage with each other via substantially pure rolling motion, can fully or partially ameliorate such moments by transmitting compensating forces through the constraint features. A diagram of these forces as exhibited by elements of such a transmission is depicted in FIG. 7.

Figure 7:
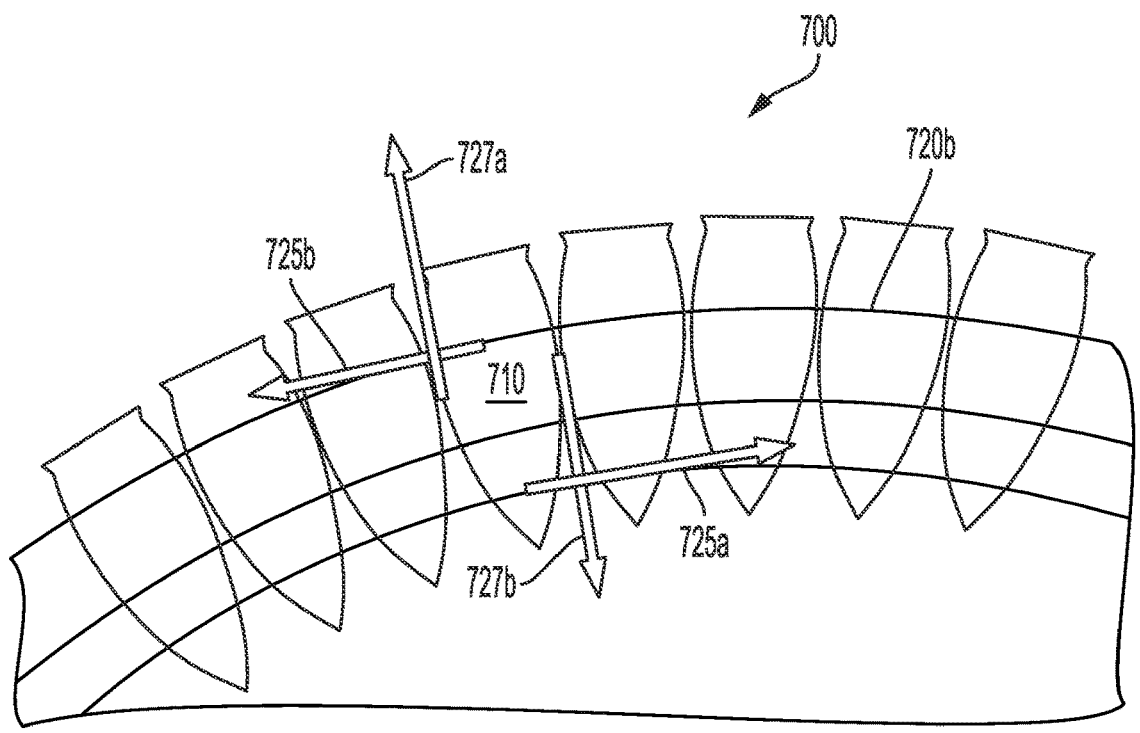
FIG. 7 is a cross-sectional view of elements of a belt and transmission.

FIG. 7 depicts a cross-section of a number of segments (including example segment 710) of an example belt 700 (e.g., an A-belt) as described herein. The plane of the cross-sectional view is perpendicular to the length of the belt 700. Each segment has contact surfaces that contact and transmit forces to and from neighboring segments. The shape of such contact surfaces can be circular, elliptical, or other specified shapes such that the segments can engage with each other via substantially pure rolling motion. The belt also includes constraint features (straps passing around/between the segments, interlocking hemispherical or otherwise-shaped protruding features configured to seat within corresponding features on neighboring segments, etc., not shown) configured to maintain the alignment of the segments relative to each other, to constrain the segments to engage in substantially pure rolling motion relative to each other, and to prevent segments of the belt from being 'ejected' from the belt when the segments are 'floating' between contact with either pulley of a transmission. The line of contact between the wedges and a pulley of the transmission is depicted by curve 720a, while the line of contact between adjacent wedges is depicted by curve 720b. These contact points exert opposing forces onto the example segment 710, depicted by 725a and 725b, respectively. Being offset from each other, these forces can impart a skewing moment onto the example segment 710. However, constraint features (straps, interlocking protruding features on the surfaces of the wedges) configured to constrain the wedges to engage in the substantially pure rolling relative to each other can exert compensating forces to counter the skewing moment, maintaining the segments in proper alignment with each other and with the pulley. These countering forces, exerted onto the example segment 710 by segments to the left and right of it, are depicted by 727a and 727b, respectively. Such a configuration can greatly simplify belt design and reduce the total drive volume by as much as 40% for a given torque.

As noted above, the geometry of the segments of a belt, and in particular the geometry of the contact surfaces by which adjacent belt segments contact each other, can be specified to improve the efficiency of a transmission containing the belt by making it more likely that the segments engage with each other in substantially pure rolling motion. This reduces wear and noise, increases efficiency and belt lifetime, and increases the torque and/or energy capacity of the transmission. The geometry of the belt segments can also be specified to increase the stability of the belt at the locations where the belt segments "float" from contact with one pulley to contact with the other, ensuring that large loads can be compressively transmitting across such 'floating' belt segments despite the lack of stabilizing forces exerted by either pulley directly.

Figure 5A:
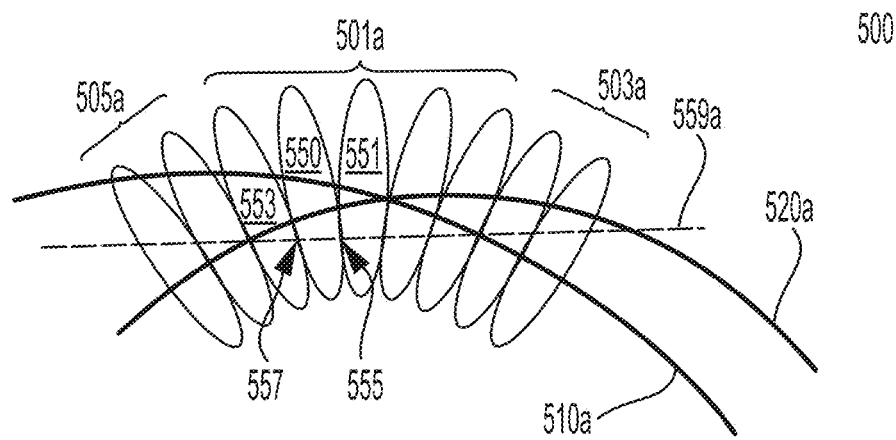
FIG. 5A is a cross-sectional view of elements of a belt of an example transmission.

FIG. 5A depicts segments (e.g., segments 550, 551, 553) of a belt 500. A first subset 501a of the segments is in contact with no pulley (or 'floating'), a second subset 503a is in contact with a first pulley, and a third subset 505a is in contact with a second pulley. The second subset 503a is in contact with the first pulley along a first pitch line 510a of the first pulley, which defines the effective diameter of the first pulley with respect to its interaction with the belt 500, and the third subset 505a is in contact with the second pulley along a second pitch line 520a of the second pulley, which defines the effective diameter of the second pulley with respect to its interaction with the belt 500. The overall transmission ratio of the transmission is related to the ratio between the radii of the pitch lines 510a, 520a.

Force/work is transmitted from the first pulley to the second pulley (or vice versa) via the 'floating' first subset 501 of belt segments. When the belt segments have been configured to engage with each other via substantially pure rolling motion (e.g., by having contact surfaces that conform to circular or other elliptical cross-sections, as depicted in FIG. 5A), these forces are transmitted from segment to segment, from the first pitch circle 510a to the second pitch circle 520a, along a straight line 559a. Each belt segment is configured to engage with its neighbors such that it contacts the neighbors at points along the line 559a, thereby facilitating the transmission of forces along the line 559a. So, for example, a first belt segment 550 of the floating segments 501a contacts a first neighboring belt segment 551 at a first contact point 555 and a second neighboring belt segment 553 at a first contact point 557.

Note that practical implementation of a belt will result in some deviation from pure rolling motion, and so some portion of the transmitted force may be transmitted between segments at locations slightly off of the line 559a and/or in directions other than perfectly parallel to the direction of the line 559a. Indeed, the belt segments may include hemispherical protrusions/pits, wrapping belts or straps, or other alignment features to ensure the alignment of the belt segments, and some portion of the transmitted force may be transmitted via such alignment features (with the direction and location of the force transmitted thereby acting to maintain the belt segments in proper alignment).

Figure 5B:
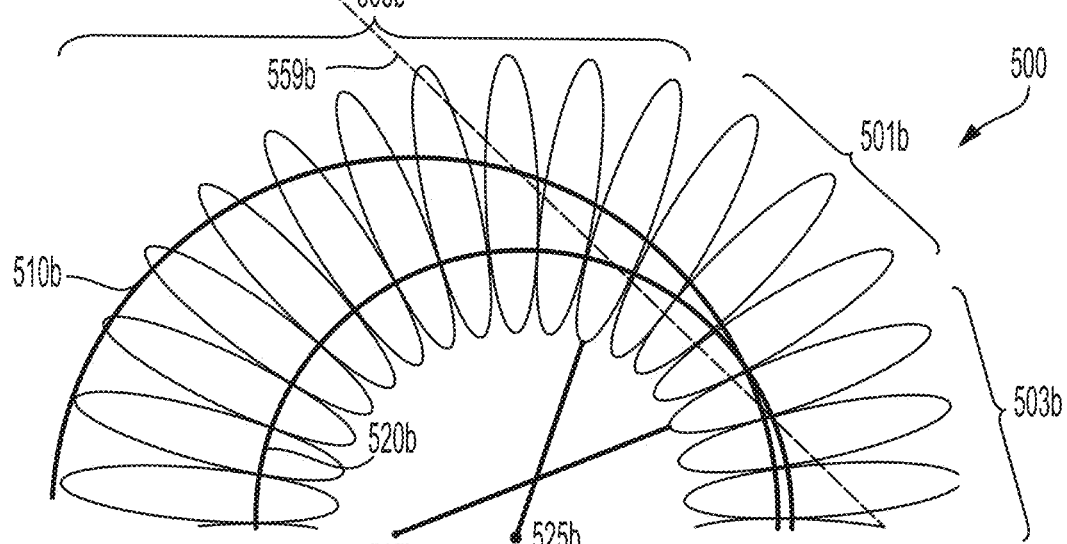
FIG. 5B is a cross-sectional view of elements of the belt of the example transmission shown in FIG. 5A.
Figure 5C:
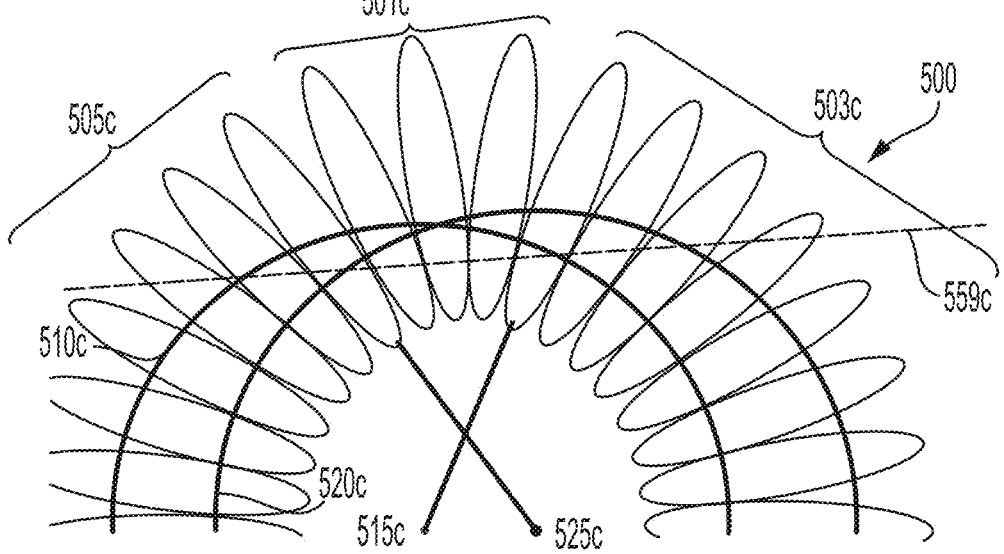
FIG. 5C is a cross-sectional view of elements of the belt of the example transmission shown in FIG. 5A.

The effective diameter of the pulleys could be modified in order to adjust the transmission ratio of the transmission, thereby adjusting the number and location of segments in contact with the first and second pulleys and of segments that are 'floating' in contact with neither pulley. FIG. 5B illustrates the configuration of the belt 500 when the transmission is set to have a torque ratio of 1.36:1. The axes of rotation 515b, 515b of the first and second pulleys, respectively, as well as the locations of their respective pitch lines 510b, 520b in this configuration are depicted in FIG. 5B. Also depicted in FIG. 5B is the location of the line 559b along which compressive forces are transmitted from the first pulley to the second pulley (or vice versa). FIG. 5C illustrates the configuration of the belt 500 when the transmission is set to have a torque ratio of 0.96:1. The axes of rotation 515c, 515c of the first and second pulleys, respectively, as well as the locations of their respective pitch lines 510c, 520c in this configuration are depicted in FIG. 5C. Also depicted in FIG. 5C is the location of the line 559c along which compressive forces are transmitted from the first pulley to the second pulley (or vice versa).

III. Experimental Results

A transmission as described herein, having 'radially inverted' pulleys that exert forces 'inward' onto a compressive, push-type belt, was assessed experimentally across a variety of conditions and configurations in order to verify the benefits of such a transmission. In particular, a transmission having two pulleys whose axes of rotation were 'static' (e.g., similar to the transmission 400 depicted in FIGS. 4A-C) was fabricated and evaluated. The results of this evaluation are related in this section.

The fabricated transmission had metal pulleys and a plastic belt, and was evaluated at a 1.2:1 transmission ratio without lubrication. This transmission preformed quietly without binding or jamming at 5-10 Newton-meters of applied input torque, and exhibited an efficiency over 90%. Noise vibration harshness increased for applied torque above ~20 Newton-meters. The performance of the transmission was assessed from 30-210 RPM, with a less than 3% efficiency loss observed across that range. Peak power transmission was observed at 210 RPM and 22 Newton-meter input, for a total of 78 Watts output.

Figure 8A:
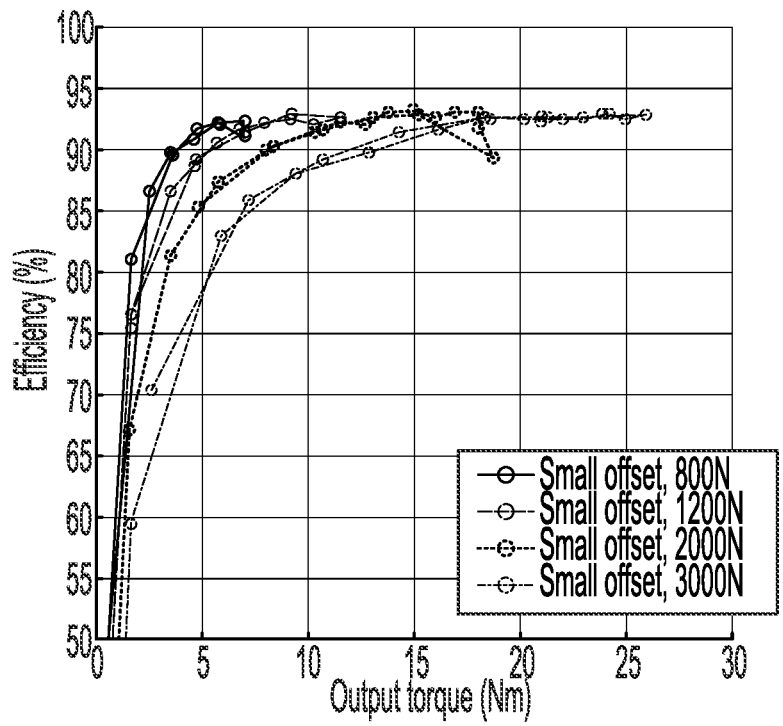
FIG. 8A depicts experimental results, according to an example embodiment.
Figure 8B:
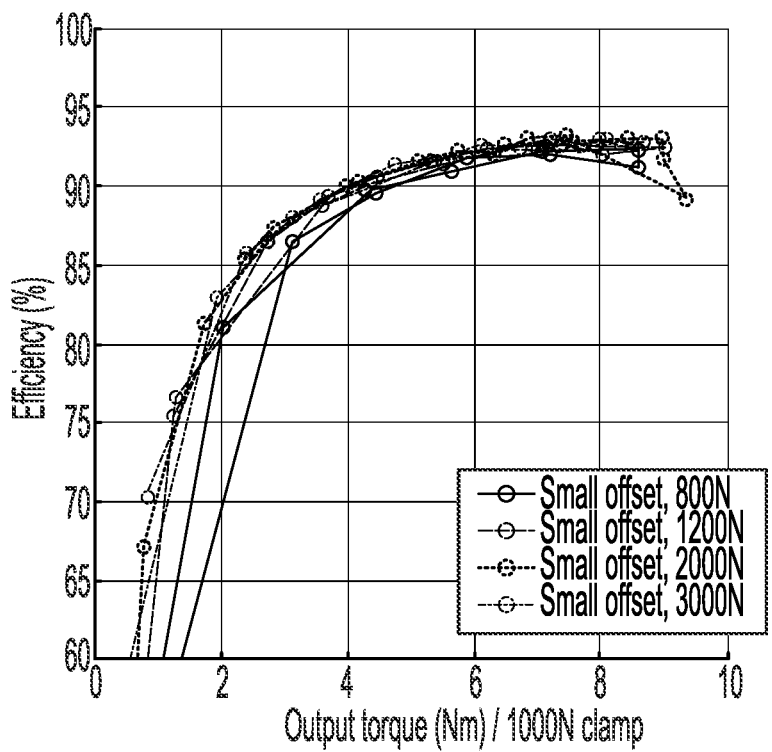
FIG. 8B depicts experimental results, according to an example embodiment.

The transmission was also evaluated with a steel belt, at a transmission ratio of 1:1 and a 7 mm separation ("small offset") between the axles of the pulleys. The effect of the clamping force applied by the pulleys onto the steel belt was evaluated for its effect on efficiency and on the level of input torque that would result in slip. FIG. 8A show the results of such a test, illustrating the efficiency and maximum torque without slip of the transmission as a function of output torque for a variety of different pulley clamping force values (800, 1200, 2000, and 3000 Newtons). As shown, the maximum torque without slip was roughly linearly proportional to the pulley clamping force. FIG. 8B shows these same results, but as a function of output torque normalizes to the applied clamping force. As shown in FIG. 8B, the effects of the clamping force on the efficiency and on the normalized maximum torque without slip were roughly the same above 1000 Newtons of clamping force.

Figure 8C:
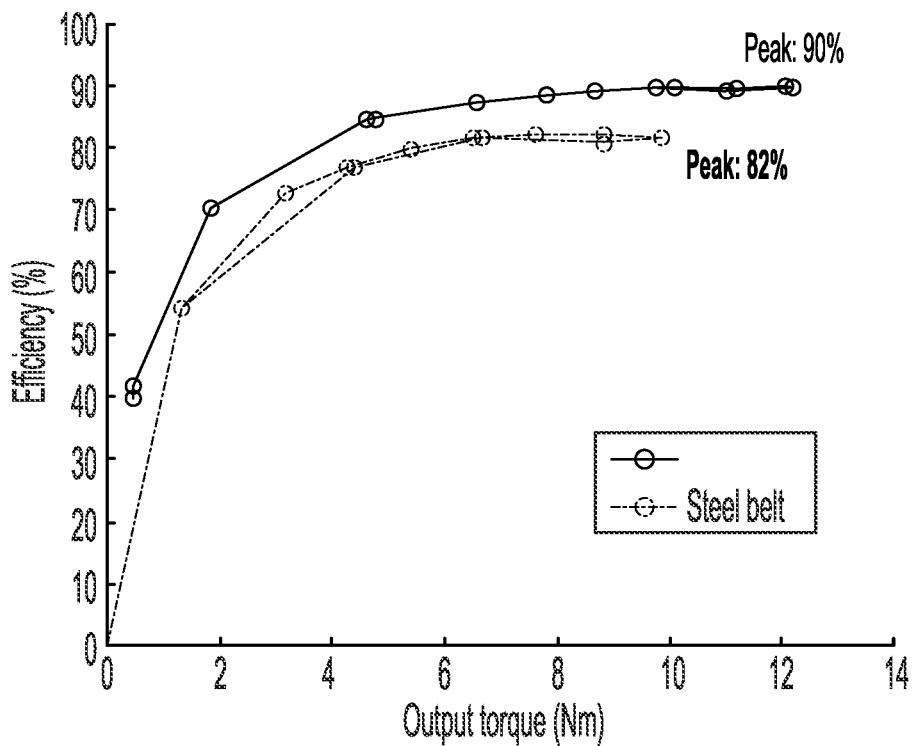
FIG. 8C depicts experimental results, according to an example embodiment.
Figure 8D:
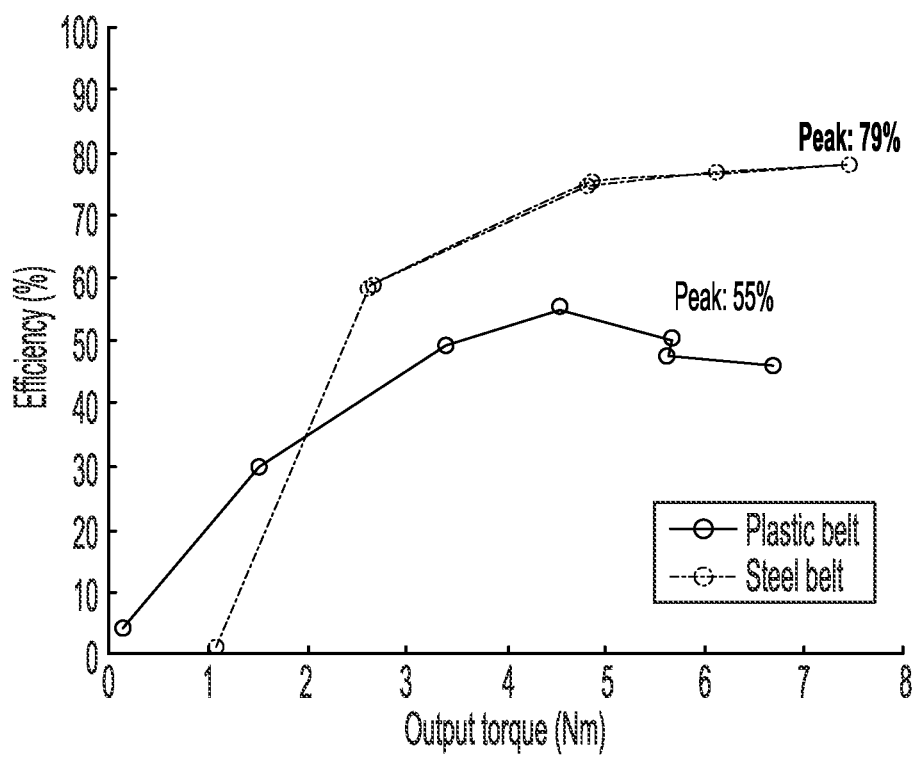
FIG. 8D depicts experimental results, according to an example embodiment.

FIGS. 8C and 8D compare the efficiency and the maximum torque without slipping of the transmission for both the plastic and steel belts under underdrive (transmission ratio 1.1:1, FIG. 8C) and overdrive (transmission ratio 0.9:1, FIG. 8D) conditions. These results indicate that the low stiffness of the plastic belt may result in poorer performance when the contact area between the belt and pulleys is reduced (e.g., during the overdrive conditions depicted in FIG. 8D). These results also imply the stiffness of the steel belt may exacerbate efficiency losses related to the belt wedges 'sticking' to the pulley surfaces.

Figure 8E:
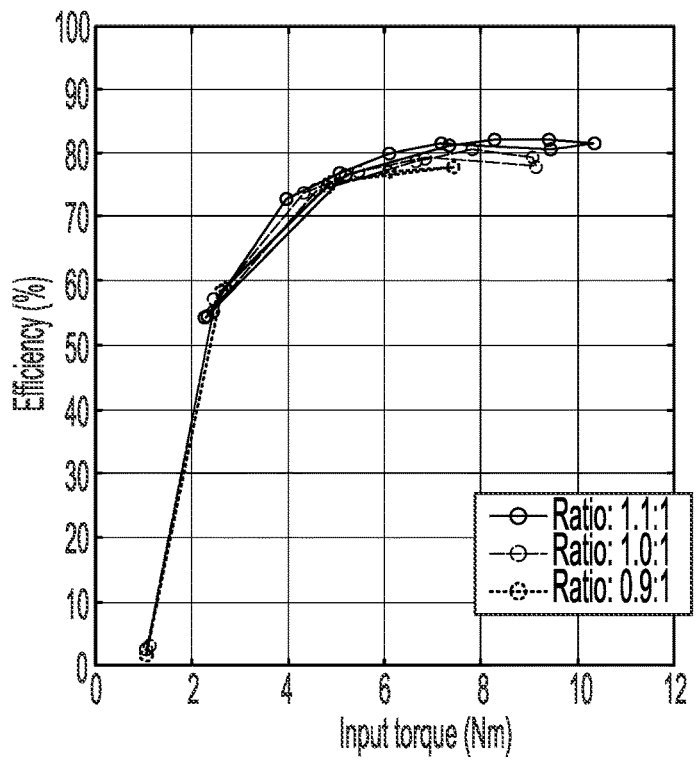
FIG. 8E depicts experimental results, according to an example embodiment.

The effect of transmission ratio on transmission efficiency and maximum torque without slip were also investigated for the steel belt transmission, with the pulley axles at a 24 millimeter separation ("large offset"). These results of depicted in FIG. 8E, for transmission ratios of 1.1:1, 1:1, and 0.9:1. As shown in FIG. 8E, efficiency and torque capacity were slightly higher in underdrive (1.1:1) and slightly lower in underdrive (0.9:1). However, these differences were small for the steel belt.

Figure 8F:
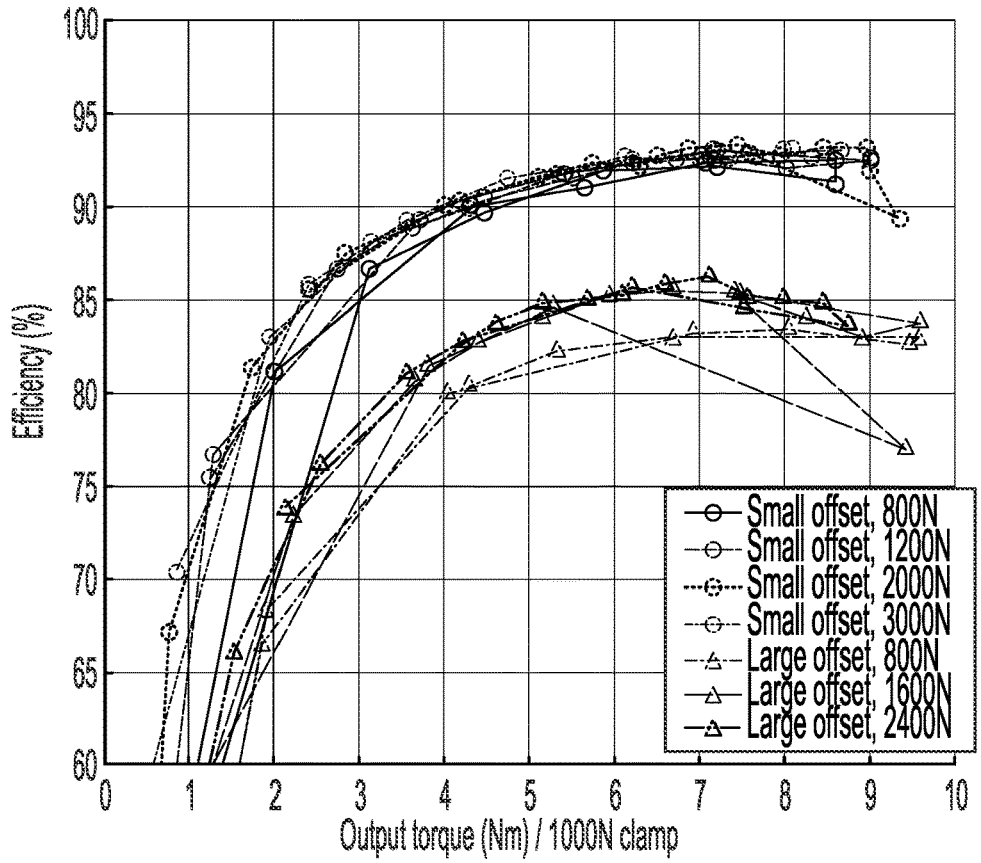
FIG. 8F depicts experimental results, according to an example embodiment.

The effect of pulley axle offset and clamping force on transmission efficiency and maximum torque without slip were also investigated for the steel belt transmission; these results are depicted in FIG. 8F. As shown, the larger pulley axle offset ("large offset," 24 millimeters) was less efficient, but exhibited similar maximum torque without slip, than smaller pulley axle offset ("small offset," 7 millimeters) as a function of output torque normalized to clamping force. The effects of clamping force were minimal above approximately 1000 Newtons.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A transmission comprising:
   a first split pulley defining a first axis and comprising first and second half-pulleys, wherein the first half-pulley has a first contact surface that is radially symmetric about the first axis and that is concave, and wherein the second half-pulley has a second contact surface that is radially symmetric about the first axis and that is concave;
   a second split pulley defining a second axis and comprising third and fourth half-pulleys, wherein the third half-pulley has a third contact surface that is radially symmetric about the second axis and that is concave, wherein the fourth half-pulley has a fourth contact surface that is radially symmetric about the second axis and that is concave, and wherein the second pulley is nested within the first pulley; and
   a belt, wherein the belt is in contact with the first split pulley via the first and second contact surfaces and with the second split pulley via the third and fourth contact surfaces, wherein a torque applied to the second split pulley causes a torque to be realized at the first split pulley via a compressive force transmitted along the belt from the second split pulley to the first split pulley, wherein the belt is in contact with the first split pulley via first and second contact surfaces of the belt that face toward each other and wherein the belt is in contact with the second split pulley via third and fourth contact surfaces of the belt that face away from each other.

2. The transmission of claim 1, wherein the belt experiences a net compressive force along the length of the belt at every location along the length of the belt.

3. The transmission of claim 2, wherein the belt does not include a longitudinal band that is under tension.

4. The transmission of claim 1, wherein the belt comprises a plurality of belt segments.

5. The transmission of claim 4, wherein each belt segment of the belt engages with neighboring segments of the belt via contact surfaces shaped such that the belt segments engage with each other via rolling motion along the contact surfaces, and wherein greater than 90% of the compressive force transmitted along the belt from the second split pulley to the first split pulley is transmitted via the contact surfaces of the belt segments.

6. The transmission of claim 5, wherein the contact surfaces of the belt segments have shapes that conform to portions of an elliptical cylinder.

7. The transmission of claim 1, wherein the transmission is configured to control a transmission ratio of the transmission by adjusting a separation between the first and second half-pulleys and a separation between the third and fourth half-pulleys.

8. The transmission of claim 1, further comprising:
   an input member; and
   an output member;
   wherein the second split pulley is rotatable about the second axis, wherein the first split pulley is coupled to a mechanical ground such that the first split pulley is prevented from rotating about the first axis, wherein rotation of the input member results in movement of the second axis about the first axis, and wherein the output member is coupled to the second split pulley such that rotation of the second split pulley results in rotation of the output member and further such that a torque at the input member causes a torque to be realized at the output member.

9. The transmission of claim 8, wherein the transmission is configured to control a transmission ratio of the transmission by adjusting a separation between the first and second half-pulleys and a separation between the third and fourth half-pulley, and wherein the transmission further comprises:
   a central gear that is coupled to the output member such that rotation of the central gear results in rotation of the output member, wherein the third and fourth half-pulleys comprise respective first and second ring gears having teeth that are in geared contact with the central gear such that rotation of the second split pulley results in rotation of the central gear, and wherein the third and fourth half-pulleys are arranged symmetrically about the central gear such that adjusting the separation between the third and fourth half-pulley results in symmetrical motion of the third and fourth half-pulleys toward or away from the central gear.

10. A transmission comprising:
    a first split pulley defining a first axis and comprising first and second half-pulleys;
    a second split pulley defining a second axis and comprising third and fourth half-pulleys, wherein the second split pulley is nested within the first split pulley;
    a belt, wherein the belt is in contact with the first split pulley and the second split pulley, wherein a couple between the first and second half-pulleys exerts forces onto the belt that are radially directed inward toward the first axis, wherein a couple the third and fourth half-pulleys exerts forces onto the belt that are radially directed inward toward the second axis, and wherein a torque applied to the second split pulley causes a torque to be realized at the first split pulley via a compressive force transmitted along the belt from the second split pulley to the first split pulley;
    an input member; and
    an output member;
    wherein the second split pulley is rotatable about the second axis, wherein the first pulley is coupled to a mechanical ground such that the first split pulley is prevented from rotating about the first axis, wherein rotation of the input member results in movement of the second axis about the first axis, and wherein the output member is coupled to the second split pulley such that rotation of the second split pulley results in rotation of the output member and further such that a torque at the input member causes a torque to be realized at the output member, wherein the transmission is configured to control a transmission ratio of the transmission by adjusting a separation between the first and second half-pulleys and a separation between the third and fourth half-pulley, and wherein the transmission further comprises:

a central gear that is coupled to the output member such that rotation of the central gear results in rotation of the output member, wherein the third and fourth half-pulleys comprise respective first and second ring gears having teeth that are in geared contact with the central gear such that rotation of the second split pulley results in rotation of the central gear, and wherein the third and fourth half-pulleys are arranged symmetrically about the central gear such that adjusting the separation between the third and fourth half-pulley results in symmetrical motion of the third and fourth half-pulleys toward or away from the central gear.

11. The transmission of claim 10, wherein the belt is in contact with the first split pulley via first and second contact surfaces of the belt that face toward each other and wherein the belt is in contact with the second split pulley via third and fourth contact surfaces of the belt that face away from each other.

12. The transmission of claim 10, wherein the belt experiences a net compressive force along the length of the belt at every location along the length of the belt.

13. The transmission of claim 12, wherein the belt does not include a longitudinal band that is under tension.

14. The transmission of claim 10, wherein the belt comprises a plurality of belt segments.

15. The transmission of claim 14, wherein each belt segment of the belt engages with neighboring segments of the belt via contact surfaces shaped such that the belt segments engage with each other via rolling motion along the contact surfaces, and wherein greater than 95% of the compressive force transmitted along the belt from the second split pulley to the first split pulley is transmitted via the contact surfaces of the belt segments.

16. The transmission of claim 15, wherein the contact surfaces of the belt segments have shapes that conform to portions of an elliptical cylinder.

17. A transmission having a controllable transmission ratio, the transmission comprising:

a first pulley defining a first axis, wherein the first pulley is a split pulley comprising first and second half-pulleys that are coupled to a mechanical ground such that the first pulley is prevented from rotating about the first axis;

a second pulley defining a second axis, wherein the second pulley is nested within the first pulley, wherein the second pulley comprises third and fourth half pulleys that are rotatable about the second axis, and wherein the transmission is configured to control a transmission ratio of the transmission by adjusting a separation between the first and second half pulleys and a separation between the third and fourth half pulleys;

a belt, wherein the belt is in contact with the first, second, third, and fourth half pulleys and wherein a torque applied to the second pulley causes a torque to be realized at the first pulley via a compressive force transmitted along the belt from the second pulley to the first pulley;

an input member coupled to the second pulley such that rotation of the input member results in in movement of the second axis about the first axis;

an output member coupled to the second pulley such that rotation of the second pulley results in rotation of the output member and further such that a torque at the input member causes a torque to be realized at the output member; and a central gear that is coupled to the output member such that rotation of the central gear results in rotation of the output member, wherein the third and fourth half-pulleys comprise respective first and second ring gears having teeth that are in geared contact with the central gear such that rotation of the second pulley results in rotation of the central gear, and wherein the third and fourth half pulleys are arranged symmetrically about the central gear such that adjusting the separation between the third and fourth half pulley results in symmetrical motion of the third and fourth half pulleys toward or away from the central gear.

18. The transmission of claim 17, wherein the first pulley exerts forces onto the belt that are radially directed inward toward the first axis, wherein the second pulley exerts forces onto the belt that are radially directed inward toward the second axis.

19. The transmission of claim 17, wherein the first half-pulley exerts forces onto the belt via a first contact surface that is radially symmetric about the first axis and that is concave, and wherein the third half-pulley exerts forces via a second contact surface that is radially symmetric about the second axis and that is concave.

20. The transmission of claim 17, wherein the belt is in contact with the first pulley via first and second contact surfaces of the belt that face toward each other and wherein the belt is in contact with the second pulley via third and fourth contact surfaces of the belt that face away from each other.

21. The transmission of claim 17, wherein the belt comprises a plurality of belt segments, wherein each belt segment of the belt engages with neighboring segments of the belt via contact surfaces shaped such that the belt segments engage with each other via rolling motion along the contact surfaces, and wherein greater than 90% of the compressive force transmitted along the belt from the second pulley to the first pulley is transmitted via the contact surfaces of the belt segments.

22. The transmission of claim 17, wherein the belt experiences a net compressive force along the length of the belt at every location along the length of the belt.

* * * * *